United States Patent
Satou et al.

(10) Patent No.: US 10,038,314 B2
(45) Date of Patent: Jul. 31, 2018

(54) WIRE HARNESS INSTALLATION STRUCTURE

(75) Inventors: Kunihiko Satou, Shizuoka (JP);
Atsuyoshi Yamaguchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 123 days.

(21) Appl. No.: 13/060,508

(22) PCT Filed: Jul. 30, 2009

(86) PCT No.: PCT/JP2009/063608
§ 371 (c)(1),
(2), (4) Date: Feb. 24, 2011

(87) PCT Pub. No.: WO2010/024088
PCT Pub. Date: Mar. 4, 2010

(65) Prior Publication Data
US 2011/0147078 A1    Jun. 23, 2011

(30) Foreign Application Priority Data

Aug. 29, 2008 (JP) .................................. 2008-221511
Aug. 29, 2008 (JP) .................................. 2008-221811

(51) Int. Cl.
*H02G 3/04* (2006.01)
*B60R 16/02* (2006.01)
*B60R 16/027* (2006.01)

(52) U.S. Cl.
CPC ......... *H02G 3/0462* (2013.01); *B60R 16/027* (2013.01); *B60R 16/0215* (2013.01)

(58) Field of Classification Search
CPC .. H02G 3/0462; B60R 16/0215; B60R 16/027
(Continued)

(56) References Cited

U.S. PATENT DOCUMENTS 4,074,463 A * 2/1978 Colanzi ................. E05F 11/405
49/349
4,389,818 A * 6/1983 Sakamoto ................ B60J 1/17
49/349
(Continued)

FOREIGN PATENT DOCUMENTS

EP    1108621 A2    6/2001
EP    1818221 A1    8/2007
(Continued)

OTHER PUBLICATIONS

Communication dated Oct. 23, 2012 issued by the Japanese Patent Office in counterpart Japanese Patent Application No. 2008-221811.
(Continued)

*Primary Examiner* — David M Sinclair
*Assistant Examiner* — Theron S Milliser
(74) *Attorney, Agent, or Firm* — Sughrue Mion, PLLC

(57) ABSTRACT

There is provided a wire harness structure which prevents an extraordinary displacement of a wire harness, and immediately discharges water from the wire harness when the water such as rain water splashes on the wire harness so that the freezing of the residing water and undesirable cutting of wires due to the freezing can be prevented. At an extending portion 13c of the wire harness, a strip-like plate spring 27 and the wires 31 are integrally combined together, and are covered with a mesh-like protective member 33 so that water will not reside therein. Even when water such as rain water splashes on the extending portion 13c, the water is discharged through mesh holes of the protective member 33, and will not reside in the extending portion 13c. Therefore, the freezing of the residing water can be prevented, and the cutting of the wires 31 can be prevented from occurring.

7 Claims, 23 Drawing Sheets

(58) Field of Classification Search
USPC .................................................. 174/72 A
See application file for complete search history.

(56) References Cited

U.S. PATENT DOCUMENTS

| | | | | |
|---|---|---|---|---|
| 4,905,413 A * | 3/1990 | Kuki | E05F 15/689 | 49/348 |
| 4,908,988 A * | 3/1990 | Yamamura | E05F 15/689 | 49/349 |
| 4,939,867 A * | 7/1990 | Harada | E05F 15/689 | 49/349 |
| 4,970,827 A * | 11/1990 | Djordjevic | E05F 11/488 | 49/349 |
| 5,309,677 A * | 5/1994 | Kunert | E05F 11/405 | 49/349 |
| 5,537,782 A * | 7/1996 | Klippert | E05F 15/689 | 49/358 |
| 5,761,851 A * | 6/1998 | Biddlecombe | B60R 16/0215 | 49/352 |
| 6,073,395 A * | 6/2000 | Fenelon | E05F 15/689 | 185/40 R |
| 6,161,894 A * | 12/2000 | Chapman | B60R 16/027 | 296/155 |
| 6,477,806 B1 * | 11/2002 | Asada | E05D 15/101 | 296/146.2 |
| 6,494,523 B2 * | 12/2002 | Kobayashi | 296/155 | |
| 6,635,825 B2 * | 10/2003 | Adachi | H02G 3/0481 | 174/135 |
| 6,659,539 B2 * | 12/2003 | Yogo | B60J 5/06 | 296/155 |
| 6,685,253 B1 * | 2/2004 | Wolcott | 296/155 | |
| 6,700,064 B2 * | 3/2004 | Aoki et al. | 174/69 | |
| 6,717,055 B2 * | 4/2004 | Kato | 174/72 A | |
| 6,781,058 B1 * | 8/2004 | DeCicco et al. | 174/72 A | |
| 6,881,902 B2 * | 4/2005 | Aoki et al. | 174/72 A | |
| 6,919,511 B2 * | 7/2005 | Tsunoda et al. | 174/72 A | |
| 6,966,148 B2 * | 11/2005 | Choi | E05F 11/483 | 296/155 |
| 7,057,109 B2 * | 6/2006 | Terada | 174/72 A | |
| 7,082,720 B2 * | 8/2006 | Kobayashi et al. | 49/360 | |
| 7,134,241 B2 * | 11/2006 | Suzuki | E05F 15/646 | 296/155 |
| 7,151,224 B2 * | 12/2006 | Kogure et al. | 174/72 A | |
| 7,213,370 B2 * | 5/2007 | Dedrich | E05F 11/382 | 49/358 |
| 7,238,029 B2 * | 7/2007 | Tsubaki | 439/34 | |
| 7,284,785 B2 * | 10/2007 | Gotou et al. | 296/155 | |
| 7,500,331 B2 * | 3/2009 | Hiramatsu | E05F 15/689 | 49/358 |
| 7,557,299 B2 * | 7/2009 | Takemoto et al. | 174/72 A | |
| 7,641,260 B2 * | 1/2010 | Ide | 296/155 | |
| 7,677,499 B2 * | 3/2010 | Weaver | 244/131 | |
| 7,708,334 B2 * | 5/2010 | Yamada | E05F 15/646 | 296/146.4 |
| 7,730,669 B2 * | 6/2010 | Kida et al. | 49/360 | |
| 7,814,637 B2 * | 10/2010 | Terada | 29/434 | |
| 7,829,789 B2 * | 11/2010 | Yamaguchi | 174/72 A | |
| 7,910,832 B2 * | 3/2011 | Pieh et al. | 174/99 R | |
| 8,039,744 B2 * | 10/2011 | Shimonishi et al. | 174/72 C | |
| 8,227,694 B2 * | 7/2012 | Murayama | 174/72 C | |
| 8,247,921 B2 * | 8/2012 | Ushiyama et al. | 307/10.1 | |
| 2001/0004022 A1 | 6/2001 | Kobayashi | | |
| 2002/0005014 A1 * | 1/2002 | Doshita et al. | 49/360 | |
| 2006/0021781 A1 * | 2/2006 | Tsubaki et al. | 174/72 A | |
| 2006/0030174 A1 | 2/2006 | Tsubaki et al. | | |
| 2007/0107926 A1 * | 5/2007 | Nishijima et al. | 174/72 A | |
| 2007/0187135 A1 | 8/2007 | Daub et al. | | |
| 2007/0243729 A1 * | 10/2007 | Tsubaki et al. | 439/76.2 | |
| 2008/0035800 A1 * | 2/2008 | Yamamoto | 248/70 | |
| 2008/0142260 A1 * | 6/2008 | Yamaguchi | 174/72 A | |
| 2008/0169127 A1 * | 7/2008 | Takemoto et al. | 174/72 A | |
| 2008/0173478 A1 | 7/2008 | Kogure et al. | | |
| 2008/0245564 A1 * | 10/2008 | Suzuki | B60R 16/0215 | 174/520 |
| 2010/0236827 A1 * | 9/2010 | Doi et al. | 174/72 A | |
| 2012/0168225 A1 * | 7/2012 | Satou | B60N 2/06 | 174/70 R |
| 2012/0267164 A1 * | 10/2012 | Reuss et al. | 174/70 R | |

FOREIGN PATENT DOCUMENTS

| | | |
|---|---|---|
| FR | 2911730 A1 | 7/2008 |
| JP | 4-51018 U | 4/1992 |
| JP | 7-16522 U | 3/1995 |
| JP | 8-149654 A | 6/1996 |
| JP | 2000-134763 A | 5/2000 |
| JP | 2001-171443 A | 6/2001 |
| JP | 2002-315168 A | 10/2002 |
| JP | 2006-074980 A | 3/2006 |
| JP | 2007-116781 A | 5/2007 |
| JP | 2008-154384 A | 7/2008 |

OTHER PUBLICATIONS

European Search Report, dated Sep. 19, 2012, issued in counterpart European Patent Application No. 09809742.1.

International Search Report issued in PCT/JP2009/063608 dated Aug. 25, 2009 (3 pages).

Office Action, dated Mar. 5, 2013, issued by the State Intellectual Property Office of the People's Republic of China in counterpart Chinese Application No. 200980133897.2.

Office Action dated Apr. 2, 2013 issued by the Japanese Patent Office in corresponding Japanese Patent Application No. 2008-221811.

Office Action dated Sep. 24, 2013, issued by the State Intellectual Property Office of the People's Republic of China in corresponding Chinese Application No. 200980133897.2.

Office Action dated Mar. 21, 2014, by the State Intellectual Property Office of the PR of China in corresponding Application No. 200980133897.2.

* cited by examiner

WIRE HARNESS INSTALLATION STRUCTURE

TECHNICAL FIELD

The present invention relates to a wire harness installation structure which is installed over a stationary structure (on which a movable structure is movably mounted) and the movable structure in order to supply electric power to an electrical part, etc., on the movable structure, for example a sliding door and a hatch-back door of an automobile.

BACKGROUND ART

For example, among wire harnesses installed in an automobile, a wire harness for supplying electric power to an electrical part, etc., on a movable structure such as a sliding door and a hatch-back door is installed over a stationary structure such as a vehicle body frame (on which the movable structure is movably mounted) and the movable structure.

FIG. 20 and FIG. 21 show conventional examples of such wire harness installation structures.

The installation structure shown in FIG. 20 is disclosed in the Patent Literature 1. A wire harness 101 to be installed is constructed such that an extending portion 107 between a fixing-side connecting portion 103 to be fixed onto a stationary structure, such for example as a vehicle body panel and a vehicle body frame, and a moving-side connecting portion 105 to be fixed onto a movable structure such as a sliding door is provided with an excess length for allowing movement of the movable structure. The extending portion 107, while bent into a generally U-shaped condition, is received in a harness receiving space 113 provided at a lower portion of a guide rail 111, and by doing so, an extraordinary displacement of the extending portion 107 in accordance with the movement of the movable structure is restrained, and at the same time the extending portion 107 is prevented from interfering with surrounding structural objects, etc.

The above guide rail 111 has a slider 115 which slidingly moves along a direction of movement of the movable structure (not shown) (direction of arrow A in FIG. 20). The extending portion 107 received in the harness receiving space 113 is connected to the slider 115 at near side of the moving-side connecting portion 105.

The slider 115 is connected to the movable structure, and moves on the guide rail 111 in accordance with the movement of the movable structure.

In the case of the installation structure shown in FIG. 21, an extending portion 107 provided between a fixing-side connecting portion 103 and a moving-side connecting portion 105 of a wire harness 101 is withdrawably wound and received in a harness receiving box 121, and by doing so, an extraordinary displacement of the extending portion 107 in accordance with the movement of the movable structure is restrained, and at the same time the extending portion 107 is prevented from interfering with surrounding structural objects, etc.

The harness receiving box 121 includes a reel rotatably mounted within a box body 123 so as to wind up the extending portion 107, and urging means such as a spring for urging this reel in a winding direction, and the reel rotates according to an amount of movement of the movable structure, so that the length of withdrawal of the extending portion 107 from the box body 123 is adjusted.

FIG. 22 and FIG. 23 also show other conventional example of wire harness installation structure, and this is disclosed in the Patent Literature 2.

FIG. 22 is a perspective view of a protector 200 configuring the wire harness installation structure, and the protector 200 having a resin material is formed into an L-shaped cross-section, and has such a bent portion. The bent portion of the protector 200 has a horizontal disposition portion 200a extending along the wire harness-installing direction, and a vertical disposition portion 200b bent right-angularly downwardly at one end of the horizontal disposition portion 200a.

The protector 200 includes a side wall 200c to be disposed along a vehicle body surface, and a bottom wall 200d, and a wire harness W/H is adapted to be passed through a space S surrounded by this bottom wall 200d and this side wall 200c.

A notch 200e for band clamp-attaching purposes is formed at an upper end of the side wall 200c of the protector 200. A band passage hole 200f is formed in that portion of the side wall 200d disposed beneath this notch 200e. Further, a clamp rest 200g having a surface coplanar with a surface of the notch 200e is formed in such a shape that it projects from an inner surface of the side wall 200c.

As shown in FIG. 23, a band clamp 211 includes a body portion 211a of a generally box-shape, and a band portion 211b extending from the body portion 211a. And, a band retaining hole 211c is formed through a lower portion of the body portion 211a, and also a retaining tubular portion 211d for vehicle body fixing purposes is provided at an upper portion thereof.

For fixing the band clamp 211 to a vehicle body 212, the retaining tubular portion 211d of the body portion 211a is projected toward the vehicle body 212 so as to form a gap C between the lower portion and the vehicle body 212 so that the band portion 211b can be drawn out. A retaining piece for retaining on a toothed portion formed on the band portion 211b is provided within the band retaining hole 211c. The band portion 211b is retained against withdrawal by the meshing engagement of the toothed portion with the retaining piece.

A retaining piece 211e is formed in a projecting manner on an inner peripheral surface of the retaining tubular portion 211d, and is adapted to retain a stud bolt 213, projecting from the vehicle body 212, inserted therein.

In the installation structure employing the protector 200 and band clamp 211 of the above construction, as shown in FIG. 22, the band portion 211b is passed through the passage hole 200f from the outside of the side wall 200c, and is wound half on the wire harness W/H, and thereafter the band portion 211b is passed through the band retaining hole 211c, and is retained, and the protector 200 and the wire harness W/H are fastened together by the band portion 211b.

With this construction, the W/H will not be turned in a clockwise direction or in a counterclockwise direction in FIG. 22, and the illustrated condition is maintained.

PRIOR ART LITERATURE

Patent Literature

Patent Literature 1: JP-A-2006-74980
Patent Literature 2: JP-A-2000-134763

SUMMARY OF INVENTION

Technical Problem

However, the conventional installation structures shown in FIG. 20 and FIG. 21 have the guide rail 111 and the harness receiving box 121, respectively, for receiving the extending portion 107. Therefore, the number of the component parts greatly increases, and besides the guide rail 111 and the harness receiving box 121 have the complicated constructions, and therefore there was a problem that the cost of an apparatus employing such installation structure increased.

Furthermore, the installation space increases because of the structures of the guide rail 111 and harness receiving box 121 covering the periphery of the extending portion 107, and there arose a problem that a space-saving design was difficult.

Further, there are known a protector constructed such that it is bendably formed by many short protector members interconnected in a longitudinal direction of a wire harness and protects the wire harness in such a manner that the wire harness can be flexibly deformed, and a corrugated tube constructed so as to be formed into a bellows-shape and protects a wire harness in such a manner that the wire harness can be flexibly deformed.

However, such conventional installation structures are not designed on the assumption that rain water, wash water, etc., splash on them. Therefore, when water splashes on the protector or the corrugated tube and intrudes into the interior thereof with the result that the water is kept collected in the protector or the corrugated tube, the water is frozen in the winter or in cold districts, so that the shape of the wire harness is fixed. And, it was feared that wires might be severed when both ends of the wire harness whose shape is fixed were moved relative to each other.

Furthermore, in the conventional installation structure shown in FIG. 22 and FIG. 23, the wire harness W/H and the protector are fastened together and are fixed to the vehicle body panel 212, and for example, and in the case where one end of the wire harness W/H is to be fixed to the vehicle body which is a stationary structure, while the other end is to be installed, for example, on a door or the like which is a movable structure, this structure is not used since the wire harness W/H can not be flexibly deformed.

A first object of the present invention is to solve the above problems, and to provide a wire harness installation structure in which an extraordinary deformation of a wire harness installed over a stationary structure and a movable structure is prevented, and by reducing the number of parts used in the installation of the wire harness and by simplifying the structures of the used parts, the cost of an apparatus employing this installation structure can be reduced, and also a space-saving design can be achieved by suppressing the increase of an installation space by the used parts, and furthermore water will not reside in the vicinity of the wire harness, so that there is no risk of freezing.

A second object of the present invention is to solve the above problems, and to provide a wire harness installation structure constructed such that an extraordinary deformation of a wire harness installed over a stationary structure and a movable structure is prevented, that by reducing the number of parts used in the installation of the wire harness and by simplifying the structures of the used parts, the cost of an apparatus employing this installation structure can be reduced, that also a space-saving design can be achieved by suppressing the increase of an installation space by the used parts, that the installed wire harness can be flexibly deformed, and that the shifting of the wire harness out of position can be prevented.

SOLUTION TO PROBLEM

The above first object of the present invention is achieved by the following configuration.

(1) A wire harness installation structure, comprising a wire in which a fixing-side connecting portion to be fixed to a stationary structure is provided at one end side of the wire in a wire extending direction thereof and a moving-side connecting portion to be fixed to a movable structure is provided at the other end side of the wire in the wire extending direction, the movable structure being provided so as to be movable relative to the stationary structure, an extending portion of the wire between the fixing-side connecting portion and the moving-side connecting portion being provided with an excess length for allowing a movement of the movable structure, wherein a strip-like plate spring is provided along the extending portion in an extending direction of the extending portion, and the extending portion is installed in a state that the extending portion is bent into a generally U-shape or curved shape, the wire harness installation structure further comprising a protective member which covers both of the extending portion and the strip-like plate spring so that water will not reside thereon.

(2) The wire harness installation structure as set forth in the above (1), wherein the protective member is comprised of synthetic fiber forming into a mesh shape; and wherein the synthetic fiber has a wear-resistance and flexibility.

(3) The wire harness installation structure as set forth in the above (1), wherein the protective member is comprised of metallic filament forming into a mesh shape; and wherein the metallic filament has a wear-resistance and flexibility.

(4) The wire harness installation structure as set forth in the above (1), wherein the protective member has a hole or a slit for draining water.

The above second object of the present invention is achieved by the following construction.

(5) A wire harness installation structure, comprising a wire in which a fixing-side connecting portion to be fixed to a stationary structure is provided at one end side of the wire in a wire extending direction thereof and a moving-side connecting portion to be fixed to a movable structure is provided at the other end side of the wire in the wire extending direction, the movable structure being provided so as to be movable relative to the stationary structure, an extending portion of the wire between the fixing-side connecting portion and the moving-side connecting portion being provided with an excess length for allowing a movement of the movable structure, wherein a strip-like plate spring is provided along the extending portion in an extending direction of the extending portion, and the extending portion is installed in a state that the extending portion is bent into a generally U-shape or curved shape, the wire harness installation structure further comprising:

a fixing-side protector to which the fixing-side connecting portion is connected, and a moving-side protector to which the moving-side connecting portion is connected; and binding bands which bind the fixing-side connecting portion of the wire and the moving-side connecting portion of the wire to the fixing-side protector and the moving-side protector respectively, together with the strip-like plate spring, wherein binding band through holes are formed in the fixing-side protector and the moving-side protector;

wherein notch portions are formed in portions of the strip-like plate spring which correspond respectively to the binding band through holes when the strip-like plate spring is located at fixing positions in the fixing-side protector and the moving-side protector; and wherein the fixing-side connecting portion and the moving-side connecting portion, together with the strip-like plate spring, are fastened respectively to the fixing-side protector and the moving-side protector by the binding bands passed through the binding band through holes.

(6) The wire harness installation structure as set forth in the above (5), further comprising:

retaining projections formed respectively at the fixing-side protector and the moving-side protector; and retaining holes formed respectively in both end portions of the strip-like plate spring, wherein when the retaining projections are engaged with the respective retaining holes, the position of the strip-like plate spring relative to the fixing-side protector and the moving-side protector is located at the proper position.

(7) The wire harness installation structure as set forth in the above (5), wherein the fixing-side connecting portion and the moving-side connecting portion are both end portions of the extending portion of the wire, respectively, which has the strip-like plate spring provided along the wire and is covered with a wear-resistant and flexible protective member.

In the configuration of the above (1), an extraordinary displacement, such as a waving movement, of the extending portion of the wire harness in accordance with the movement of the movable structure is restrained by the rigidity and effect of an elastic force of the strip-like plate spring set along the extending portion. Also, even when rain water, wash water or the like splashes on the extending portion, the water will not reside in the protective member, and therefore the freezing and cutting due to the residing of the water in the extending portion of the wire can be prevented from occurring.

In the configuration of the above (2), the protective member has the wear resistance and besides has the flexibility, and therefore the arcuately-bending and movement of the extending portion are smoothly effected. Further, the protective member has the mesh-like shape, and therefore draining is effected satisfactorily with the simple construction, and the residing of water in the extending portion of the wire as well as the freezing and cutting due to the residing of the water can be prevented.

In the configuration of the above (3), the protective member has the wear resistance and besides has the flexibility, and therefore the arcuately-bending and movement of the extending portion are smoothly effected. Further, the protective member is obtained by forming the metallic filament into the mesh-like shape, and therefore draining is effected satisfactorily with the simple construction, and the prevention of the residing of water in the extending portion of the wire as well as the freezing and cutting due to the residing of the water can be prevented. Further, an electromagnetic shielding effect is obtained, and therefore there are advantages such as one that the wire harness can be used for many purposes.

In the configuration of the above (4), draining can be effected by the hole or the slit formed in the protective member, and therefore the residing of water in the extending portion of the wire as well as the freezing and cutting due to the residing of the water can be prevented. In this case, by forming a hole or a slit in a conventional protector or a corrugated tube, the residing of water can be prevented.

In the configuration of the above (5), an extraordinary displacement, such as a waving movement, of the extending portion of the wire harness in accordance with the movement of the movable structure is restrained by the rigidity and effect of an elastic force of the strip-like plate spring set along the extending portion. Also, if the strip-like plate spring is located in the proper position at the time when it is positioned relative to the fixing-side protector and the moving-side protector, the positions of the binding band through holes correspond respectively to the positions of the notch portions formed in the strip-like plate spring, and they are fastened together, using the binding bands. The binding bands are engaged also in the notch portions, and therefore the shifting of the strip-like plate spring and wires can be prevented.

In the configuration of the above (6), when the strip-like plate spring is positioned relative to the fixing-side protector and the moving-side protector, the retaining projections are engaged respectively in the retaining holes, and therefore the retaining binding band through holes and the notch portions formed in the strip-like plate spring are properly positioned, and also the shifting of the strip-like plate spring in the longitudinal direction can be prevented.

In the configuration of the above (7), each of the fixing-side connecting portion and the moving-side connecting portion is such that the strip-like plate spring is set along the wire and is covered with the protective member, and therefore by a simple operation for tightening the binding bands, the wire, the strip-like plate spring and both end portions of the protective member are integrally connected together to the fixing-side protector and the moving-side protector.

DESCRIPTION OF EMBODIMENTS

A preferred embodiment of a wire harness installation structure of the present invention will be described below in detail with reference to the drawings.

Figure 1:
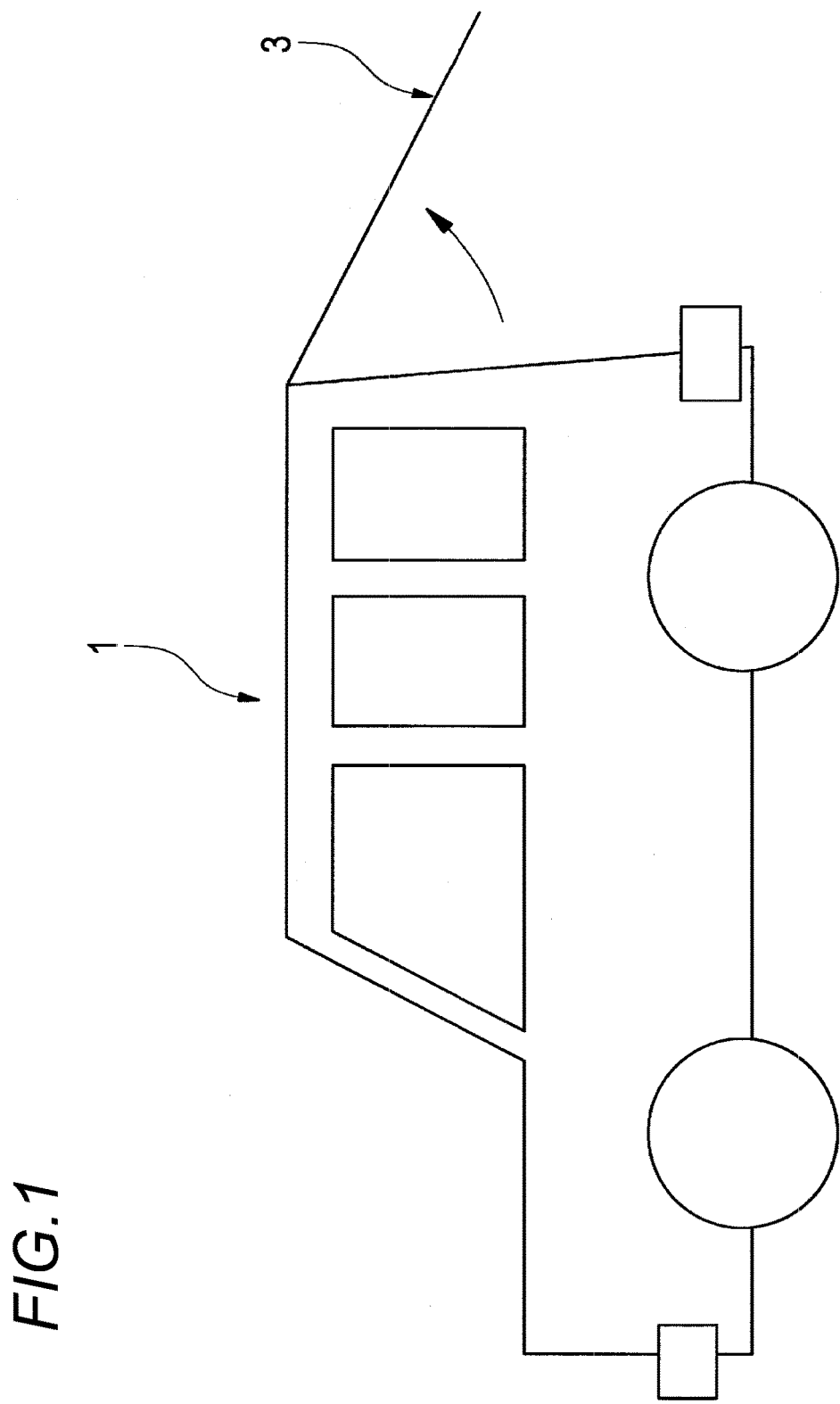
FIG. 1 is a side-elevational view of an automobile in which one embodiment of a wire harness installation structure of the present invention is employed.
Figure 2:
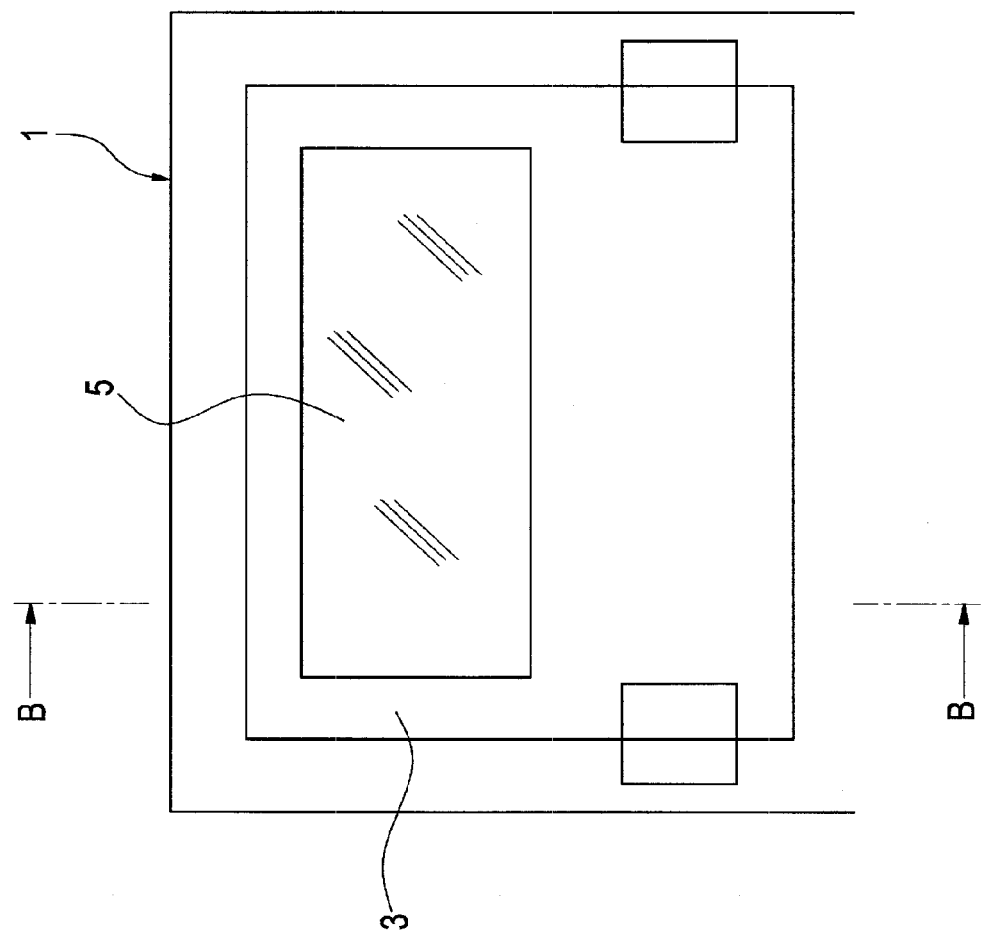
FIG. 2 is a front-elevational view of a back door of the automobile shown in FIG. 1.
Figure 3:
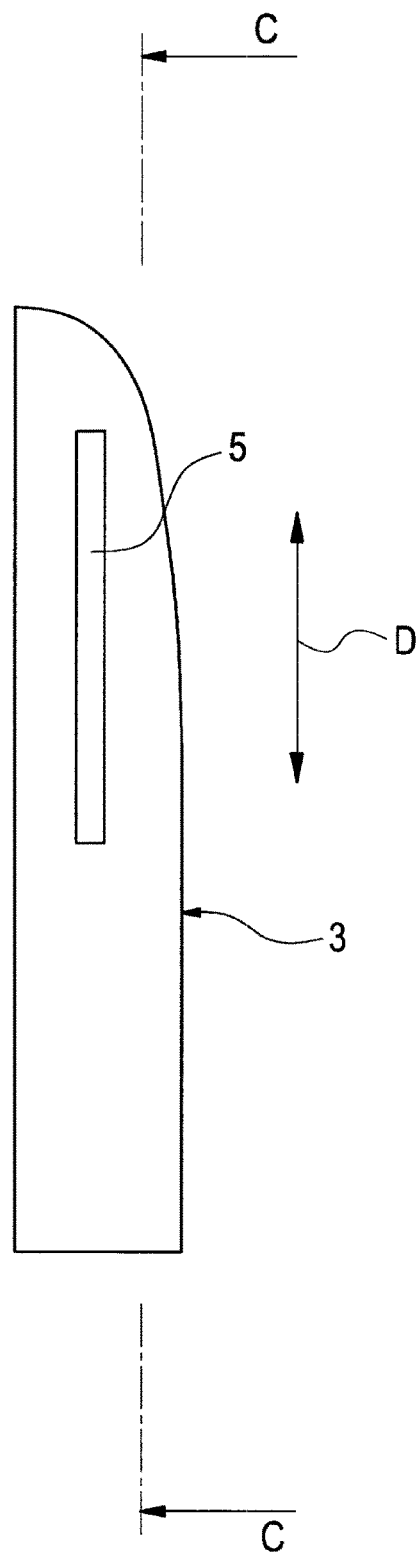
FIG. 3 is a cross-sectional view taken along the line B-B of FIG. 2.
Figure 4:
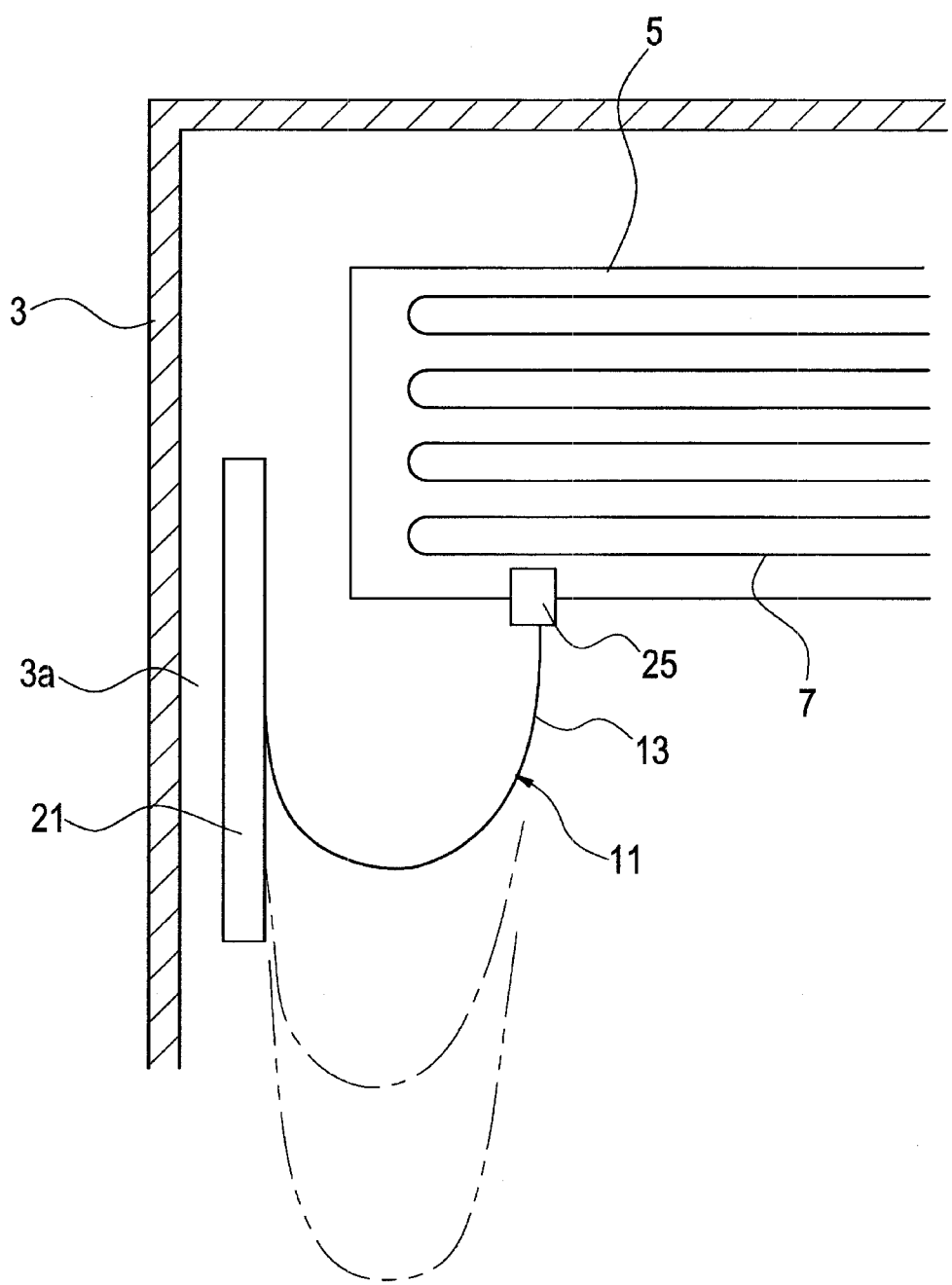
FIG. 4 is a cross-sectional view taken along the line C-C of FIG. 3.

An automobile 1 shown in FIG. 1 is provided with a back door 3 which is pivotally moved upwardly to be opened. A window glass 5 which is raised and lowered in an upward-downward direction (direction of arrow D in FIG. 3) is provided at the back door 3. An electrical part 7 such as a heating wire for defogging purposes is provided at this window glass 5.

The wire harness installation structure 1 according to the one embodiment of the present invention is such that in order to supply electric power to the electrical part 7, etc., on the window glass 5, a wire harness assembly 13 is installed over a door panel 3a of the back door 3, corresponding to a stationary structure, and the window glass 5 which is movably mounted on the door panel 3a and corresponds to a movable structure.

Figure 5:
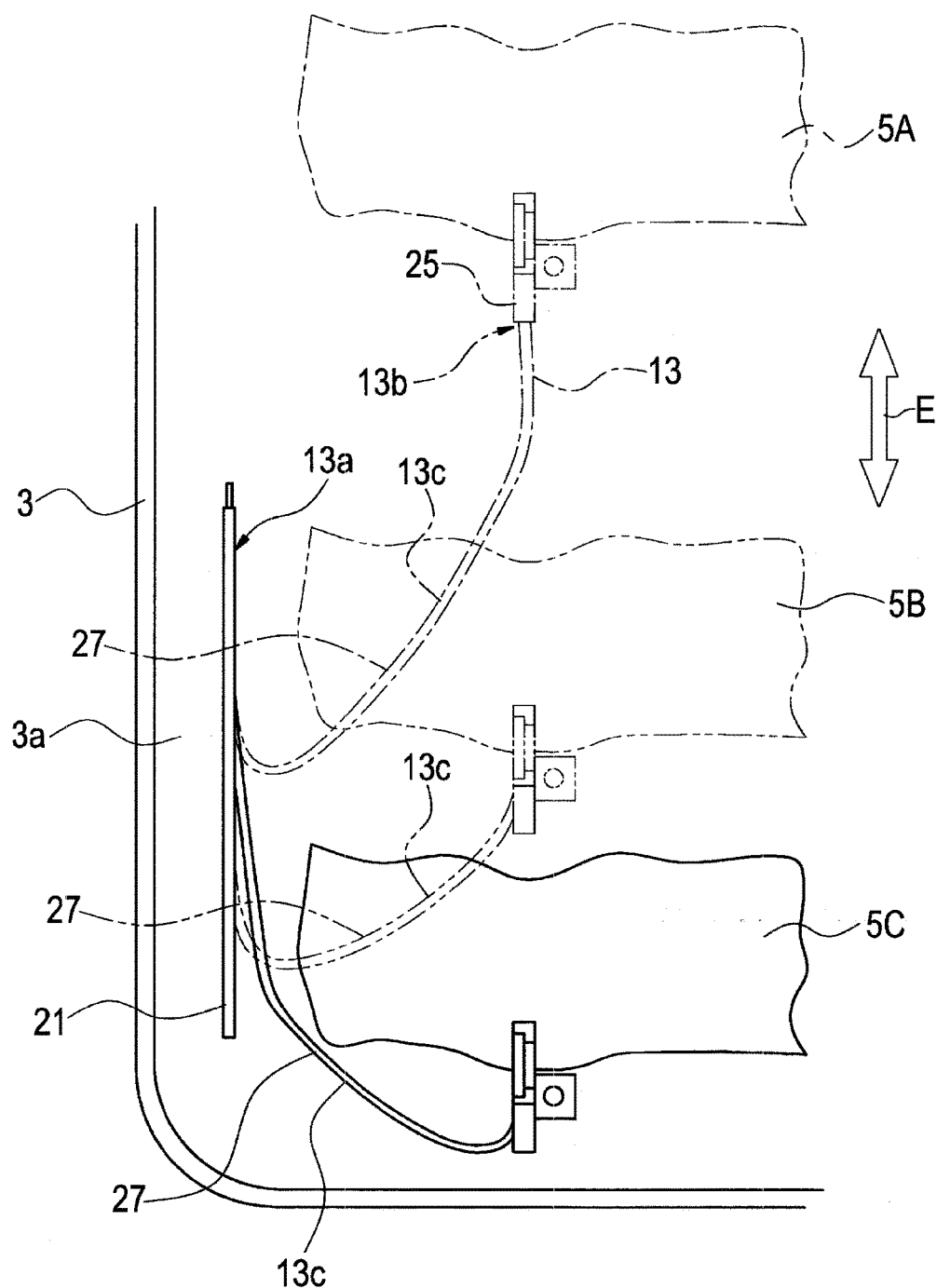
FIG. 5 is an explanatory view showing a situation in which in the wire harness installation structure shown in FIG. 4, a curved portion of an extending portion of a wire harness moves in accordance with the ascending and descending movement of a window glass which is a movable structure.

The window glass 5 is mounted on the door panel 3a by a raising and lowering mechanism (not shown) so as to be able to be raised and lowered in a direction indicated by arrow E in FIG. 5. In FIG. 5, reference numeral 5A designates the window glass moved to an upper limit position, reference numeral 5B designates the window glass moved to an intermediate position so that a window is in a half-open condition, and FIG. 5C designates the window glass 5 moved to a lower limit position so that the window is in a full open condition.

As shown in FIG. 5, a curved portion of an extending portion 13c of the wire harness assembly 13 installed over the door panel 3a and the window glass 5 is moved in accordance with the ascending and descending movement of the window glass 5.

In the case of this embodiment, a fixing-side protector 21 is fixedly provided at the inner surface side of the door panel 3a and is disposed near to the side of the window glass 5 along the upward-downward direction. This fixing-side protector 21, together with the door panel 3a, corresponds to the stationary structure.

The fixing-side protector 21 is, for example, one using a die-cut material of the channel type, and is mounted with its groove directed toward the window glass 5, and receives the wire harness assembly 13 hanging down from the door panel 3a when the window glass 5 is lowered, thereby regulating the position of the wire harness assembly 13.

The wire harness assembly 13 used in the wire harness installation structure 11 of this one embodiment is such that the extending portion 13c between a fixing-side connecting portion 13a, fixed onto the fixing-side protector 21 on the door panel 3a which is the stationary structure, and a moving-side connecting portion 13b fixed onto the window glass 5 which is the movable structure is provided with an excess length for allowing the ascending and descending movement of the window glass 5.

Figure 6:
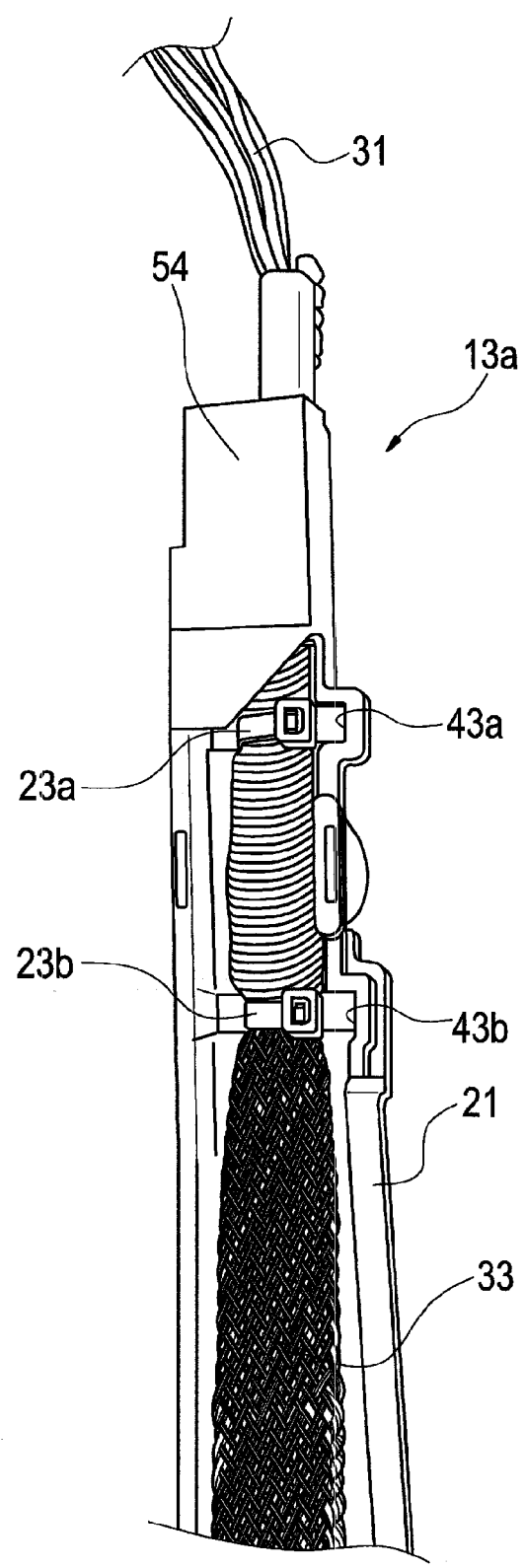
FIG. 6 is a plan view showing the construction of a fixing-side protector.

As shown in FIG. 6, the fixing-side connecting portion 13a of the wire harness assembly 13 is secured by binding bands 23a, 23b to the fixing-side protector 21 which is to be fixed to the door panel 3a. The fixing-side protector 21 is fixed onto the door panel 3a by screws or the like. The construction of the fixing-side protector 21 will be described later in detail with reference to FIG. 11 to FIG. 13.

Figure 7:
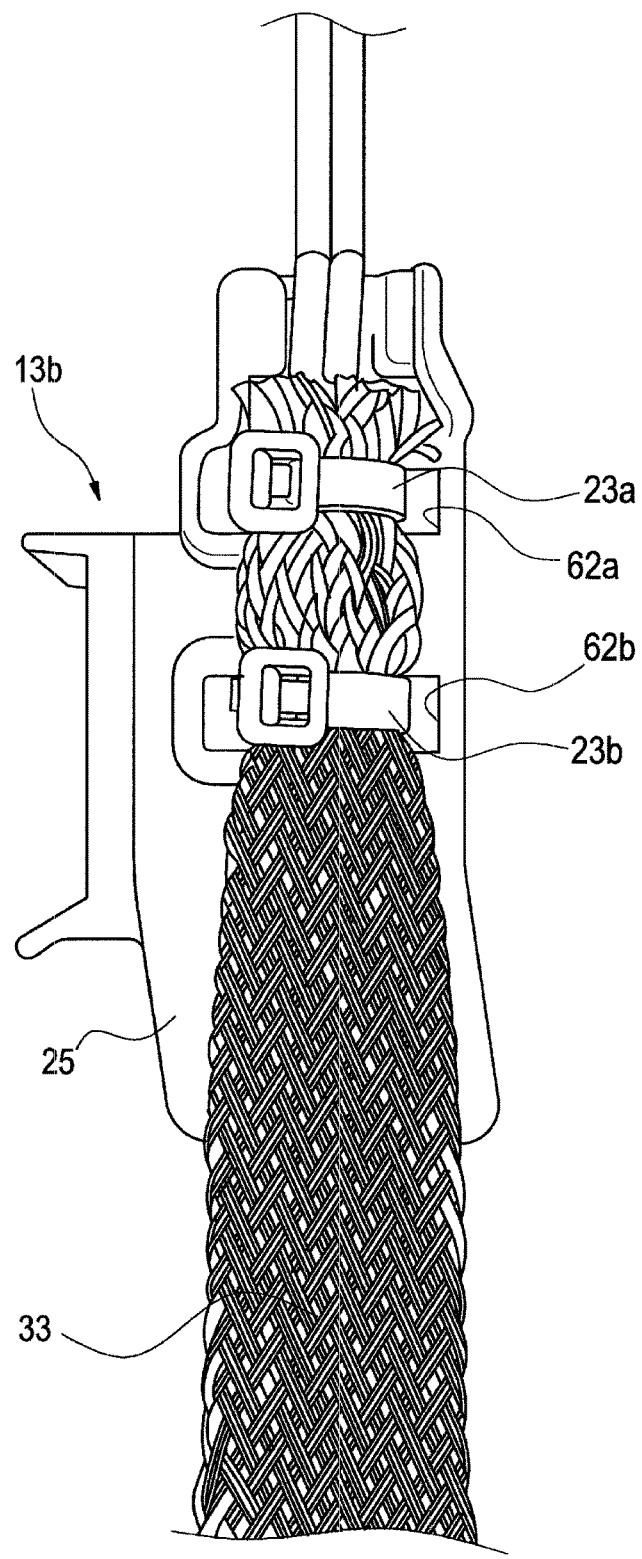
FIG. 7 is a plan view showing the construction of a moving-side protector.

As shown in FIG. 7, a moving-side protector 25 which is a connecting member for fixing the moving-side connecting portion to the window glass 5 is secured to the moving-side connecting portion 13b by binding bands 23a, 23b. The moving-side protector 25 is fixed to the window glass 5 by screws or the like. The construction of the moving-side protector 25 will be described later in detail with reference to FIG. 14 to FIG. 16.

Figure 8:
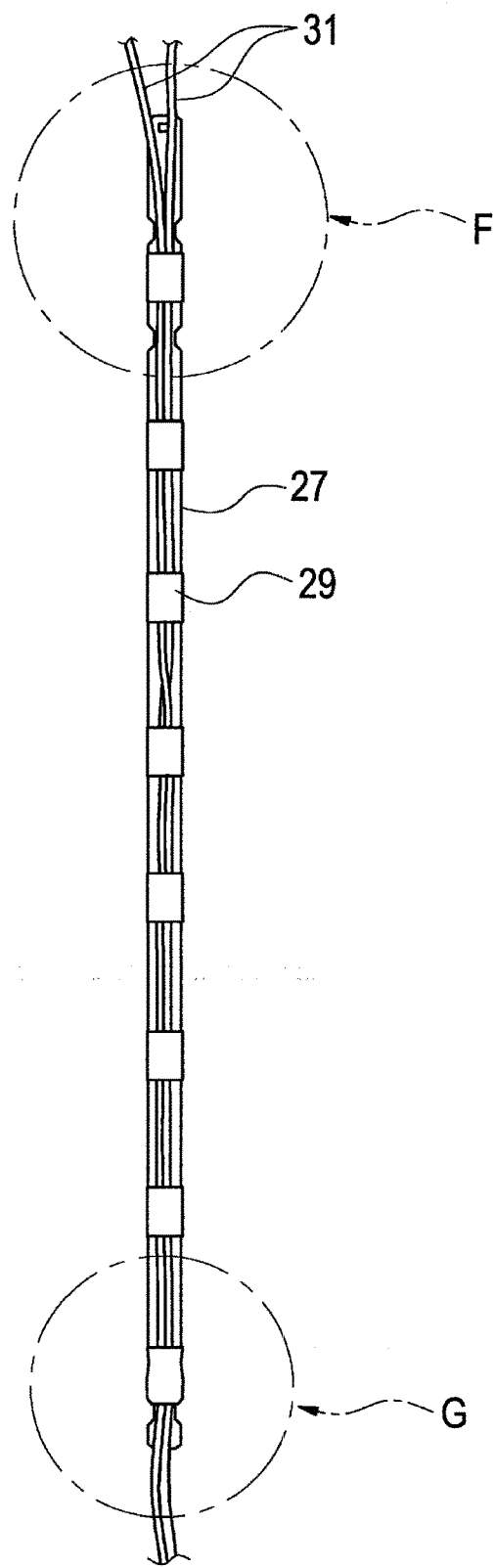
FIG. 8 is a plan view showing the fixing of wires to a strip-like plate spring.
Figure 9:
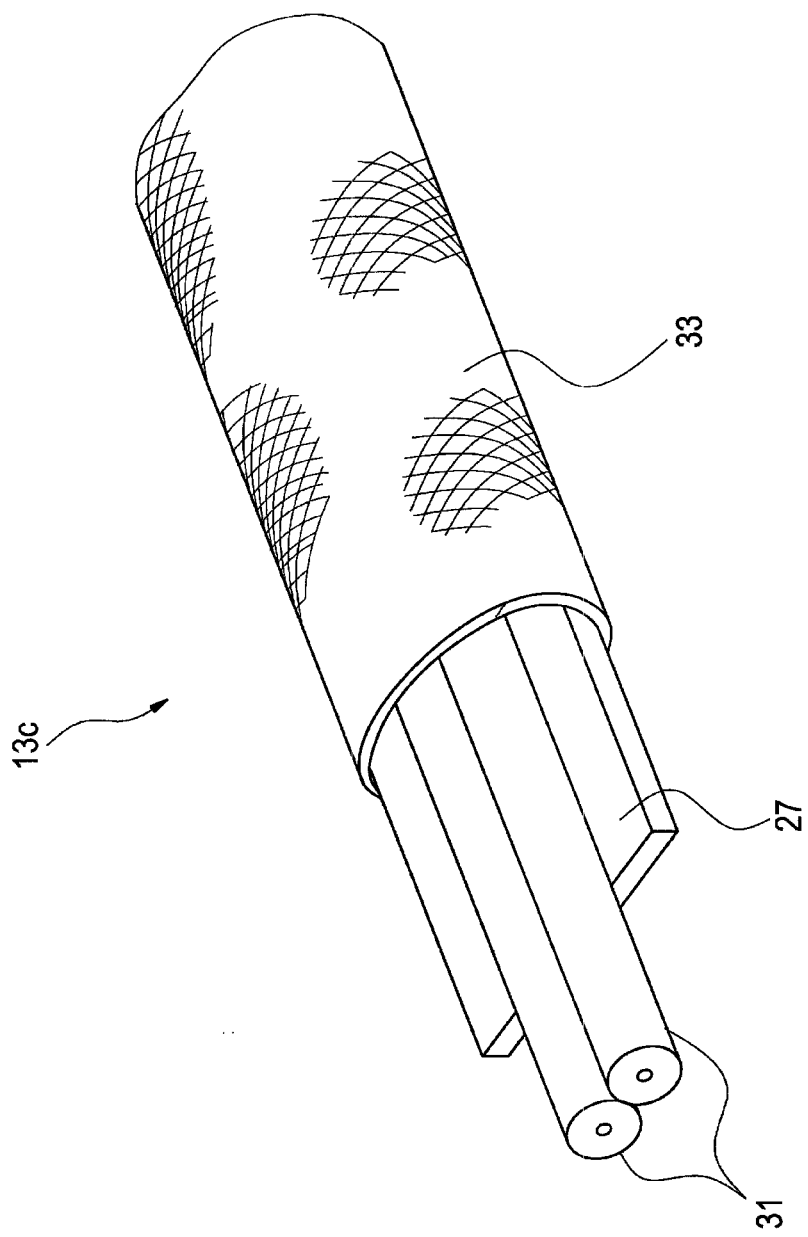
FIG. 9 is a partly-broken perspective view of the extending portion, showing a covering structure provided by a protective member.

In the wire harness assembly 13, the extending portion 13c between the fixing-side connecting portion 13a and the moving-side connecting portion 13b is such that a strip-like plate spring 27 is set longitudinally along wires 31 forming the extending portion 13c as shown in FIG. 8 and FIG. 9, and the extending portion 13c and the wires 31 are bound together by a tape wound on an outer periphery thereof or by tubular outer members 29 fitted on the outer periphery, and a protective member 33 is fitted on the periphery thereof, thereby protecting the bundle.

In this embodiment, as the protective member 33, a tubular one obtained by forming synthetic resin into a mesh-like shape is used. With this construction, even when water splashes on the extending portion 13c, it immediately flows through the interstices, and therefore the water will not reside in the extending portion 13c within the protective member 33, and an accident such as the freezing of the residing water can be prevented from happening.

Figure 10:
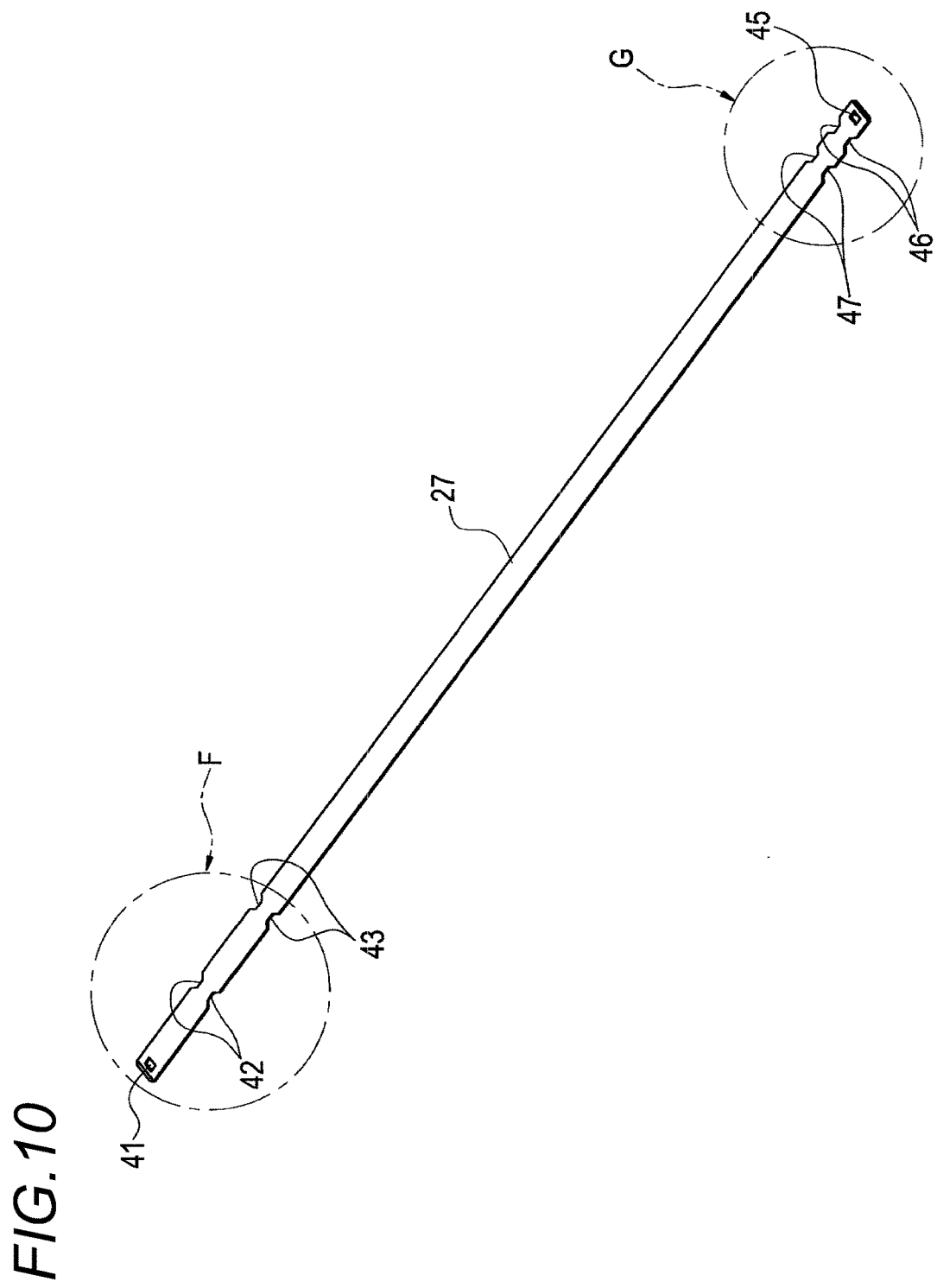
FIG. 10 is a perspective view showing the construction of the strip-like plate spring.

As shown in FIG. 10, the strip-like plate spring 27 is obtained by forming a thin sheet of stainless steel having a rust preventive effect or the like into a strip shape, and an end portion F is connected to the fixing-side protector 21. A retaining hole 41 for retaining on the fixing-side protector 21 and notch portions 42, 43 are formed in the end portion F.

On the other hand, an end portion G is connected to the moving-side protector 25. A retaining hole 45 for retaining on the moving-side protector 25 and notch portions 46, 47 are also formed in the end portion G.

Figure 11:
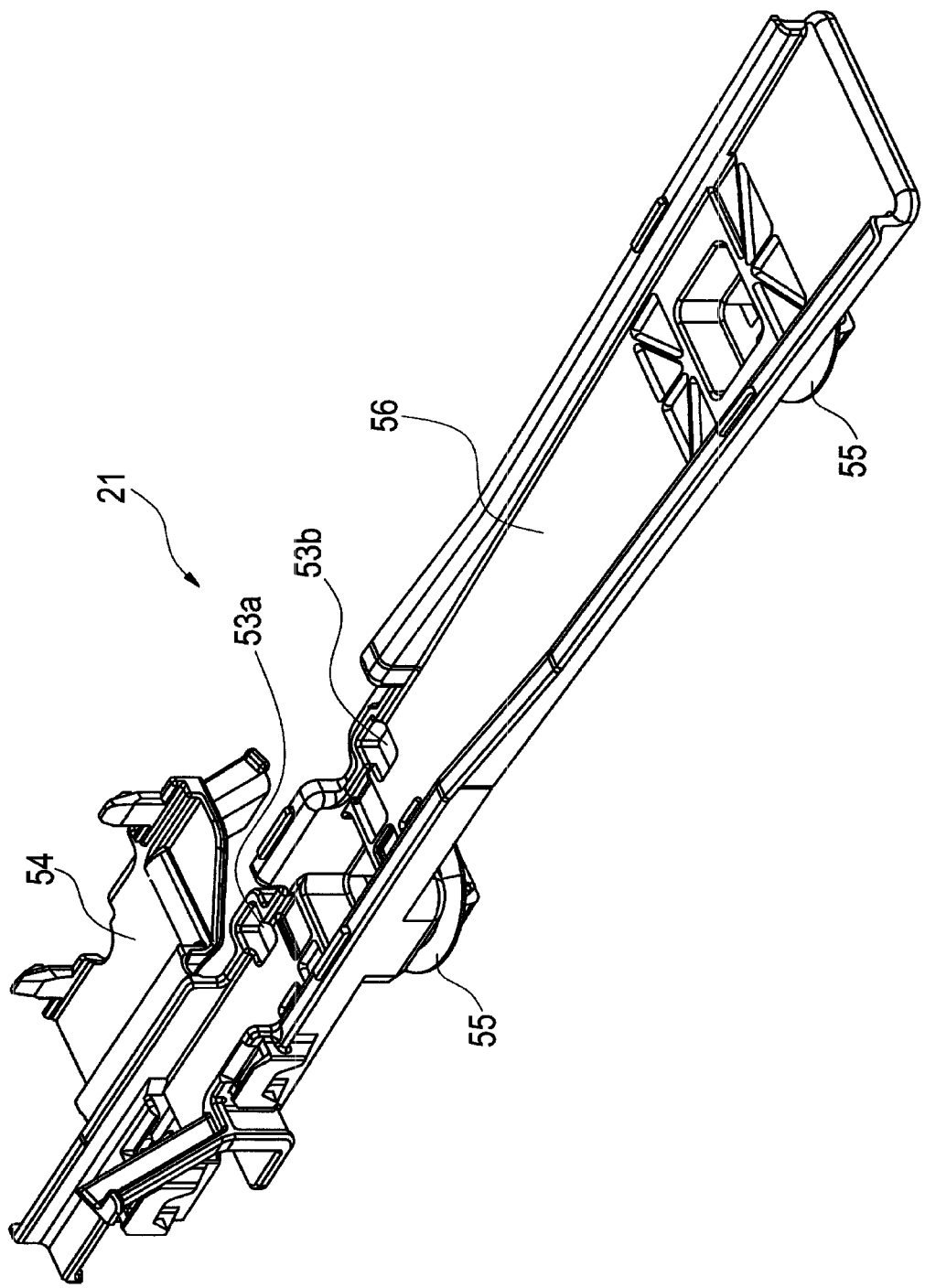
FIG. 11 is a perspective view showing the construction of the fixing-side protector.
Figure 12:
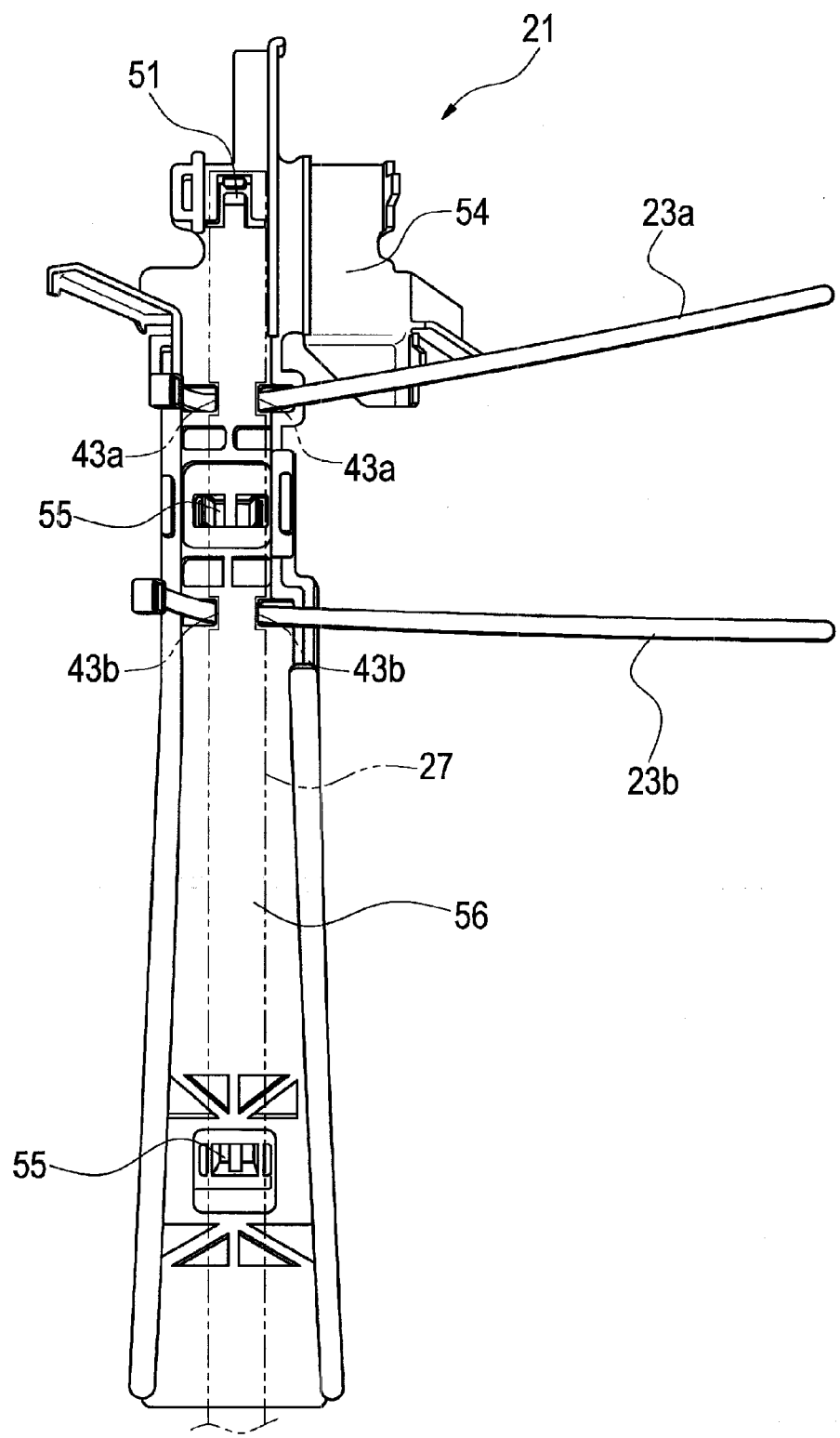
FIG. 12 is a plan view showing the construction of the fixing-side protector.

Next, the fixing-side protector 21 will be described with reference to FIGS. 11 to 13.

The fixing-side protector 21 is integrally molded, using synthetic resin, and serves to connect the fixing-side connecting portion 13a of the wire harness assembly 13 to the door panel 3a. A retaining projection 51 for retaining the retaining hole 41 formed in the strip-like plate spring 27, binding member through holes 53a, 53b for the passage of the binding bands 23a, 23b therethrough, a cover portion 54 which is closed after the connection, fixing portions 55 for fixing to the back door 3, etc., are formed integrally with the fixing-side protector 21.

Figure 13:
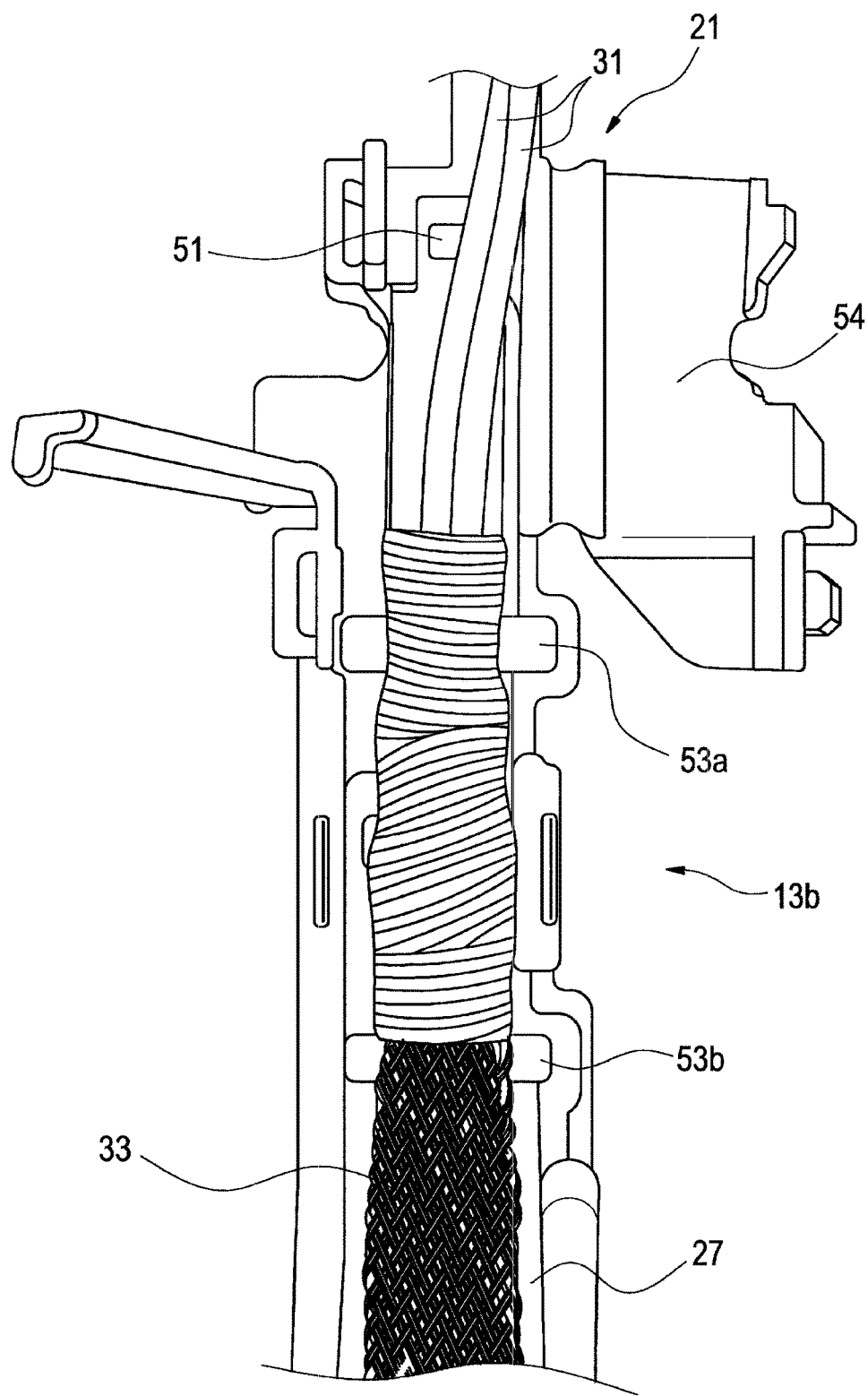
FIG. 13 is a plan view showing the positioning of the wire harness relative to the fixing-side protector.

For connecting the fixing-side connecting portion 13a to the fixing-side protector 21, the fixing-side connecting portion 13a is located in the vicinity of the cover portion 54, and the retaining hole 41 formed in the end portion F of the strip-like plate spring 27 is retained on the retaining projection 51 as shown in FIG. 13. Then, the fixing-side connecting portion 13a is fastened and fixed to the fixing-side protector 21, using the binding bands 23a, 23b passed through the binding member through holes 53a, 53b.

Then, if other wires need to be installed as shown in FIG. 6, they are installed, and after an end processing is effected, the cover portion 54 is closed, thus completing the connection of the fixing-side connecting portion 13a to the fixing-side protector 21. In the case where this fixing-side protector 21 is fixed to the door panel 3a as described above, the extending portion 13a hangs down along a flat plate-like guide portion 56, and makes the upward and downward movement as described with reference to FIG. 5.

Figure 14:
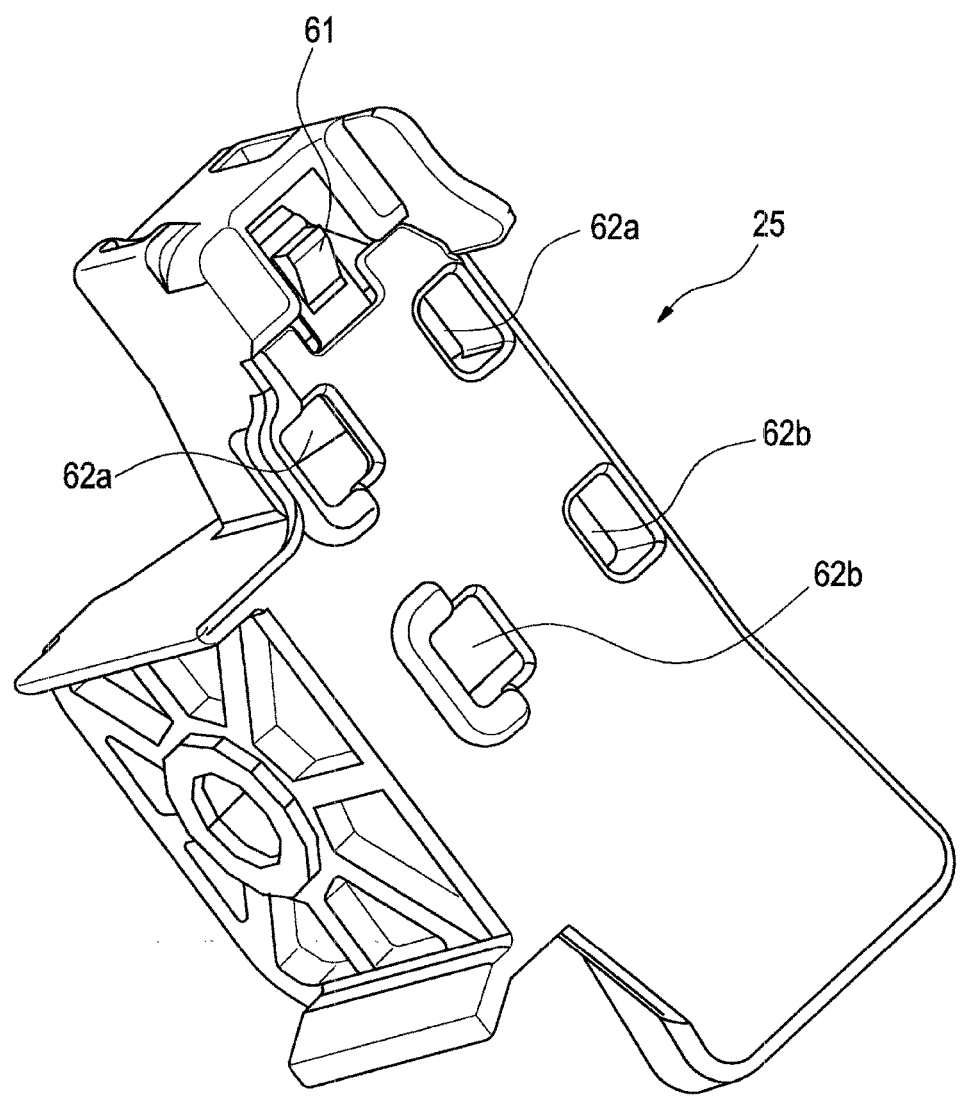
FIG. 14 is a perspective view showing the construction of the moving-side protector.
Figure 15:
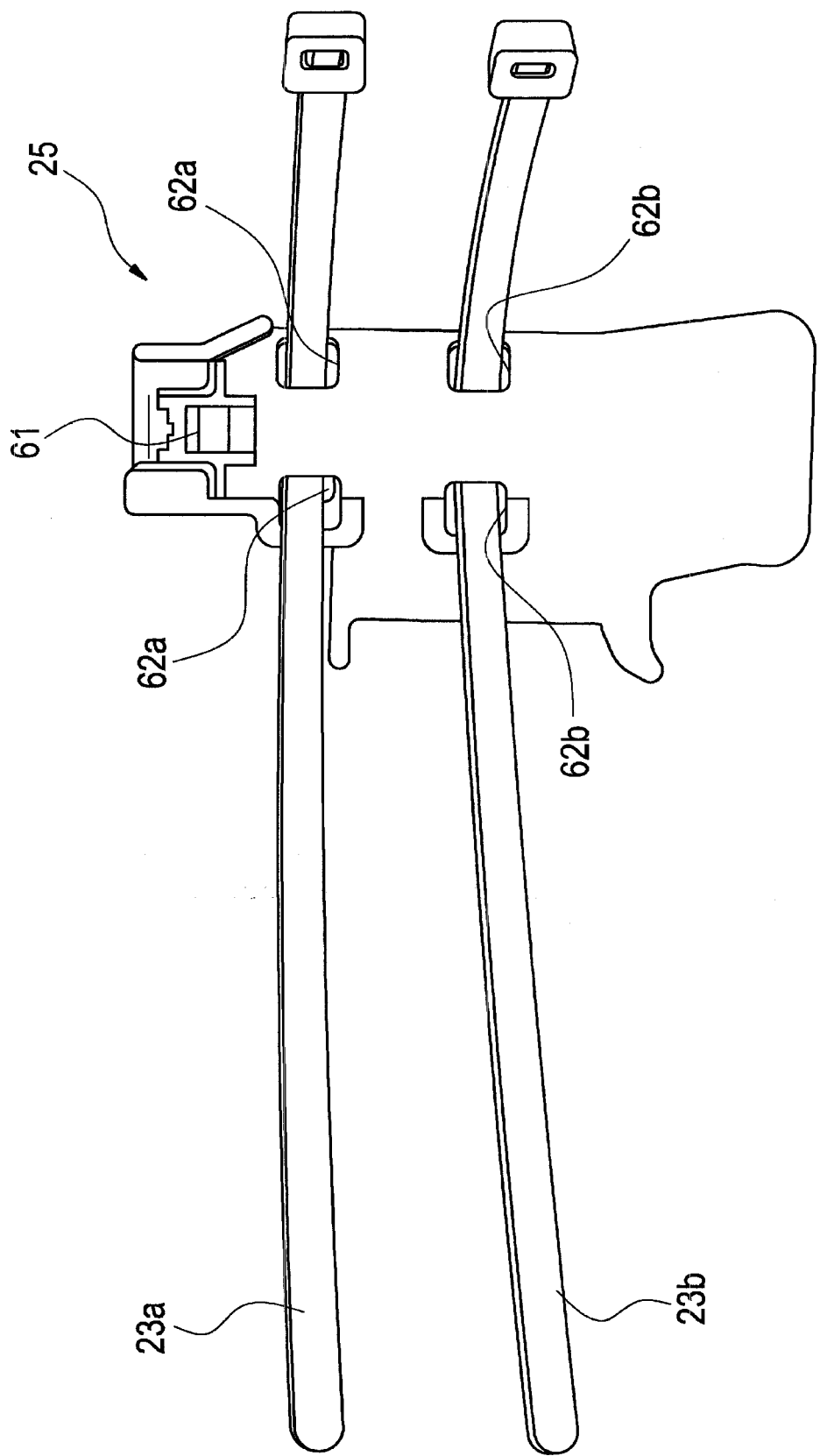
FIG. 15 is a plan view showing the construction of the moving-side protector.
Figure 16:
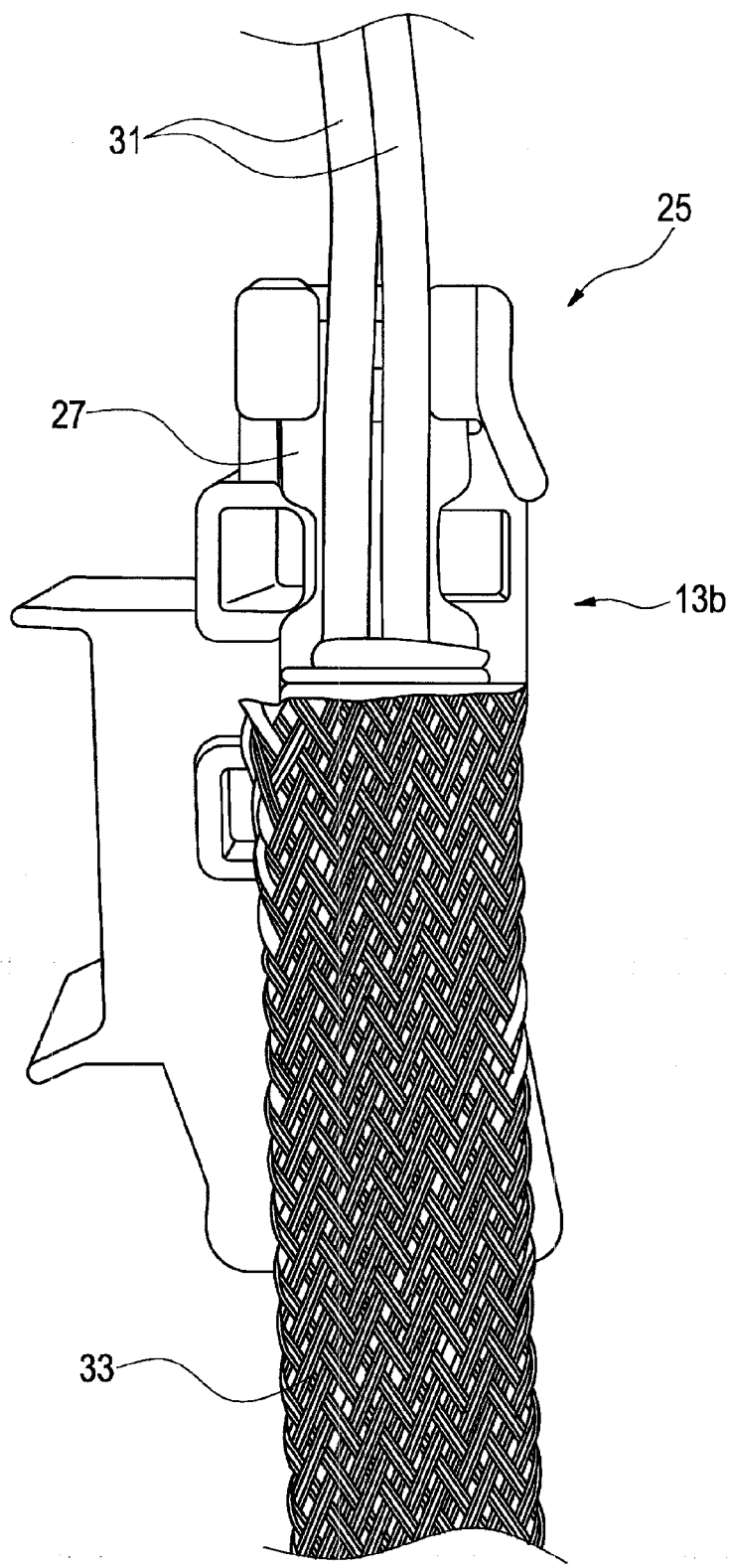
FIG. 16 is a plan view showing the positioning of the wire harness relative to the moving-side protector.
Figure 17:
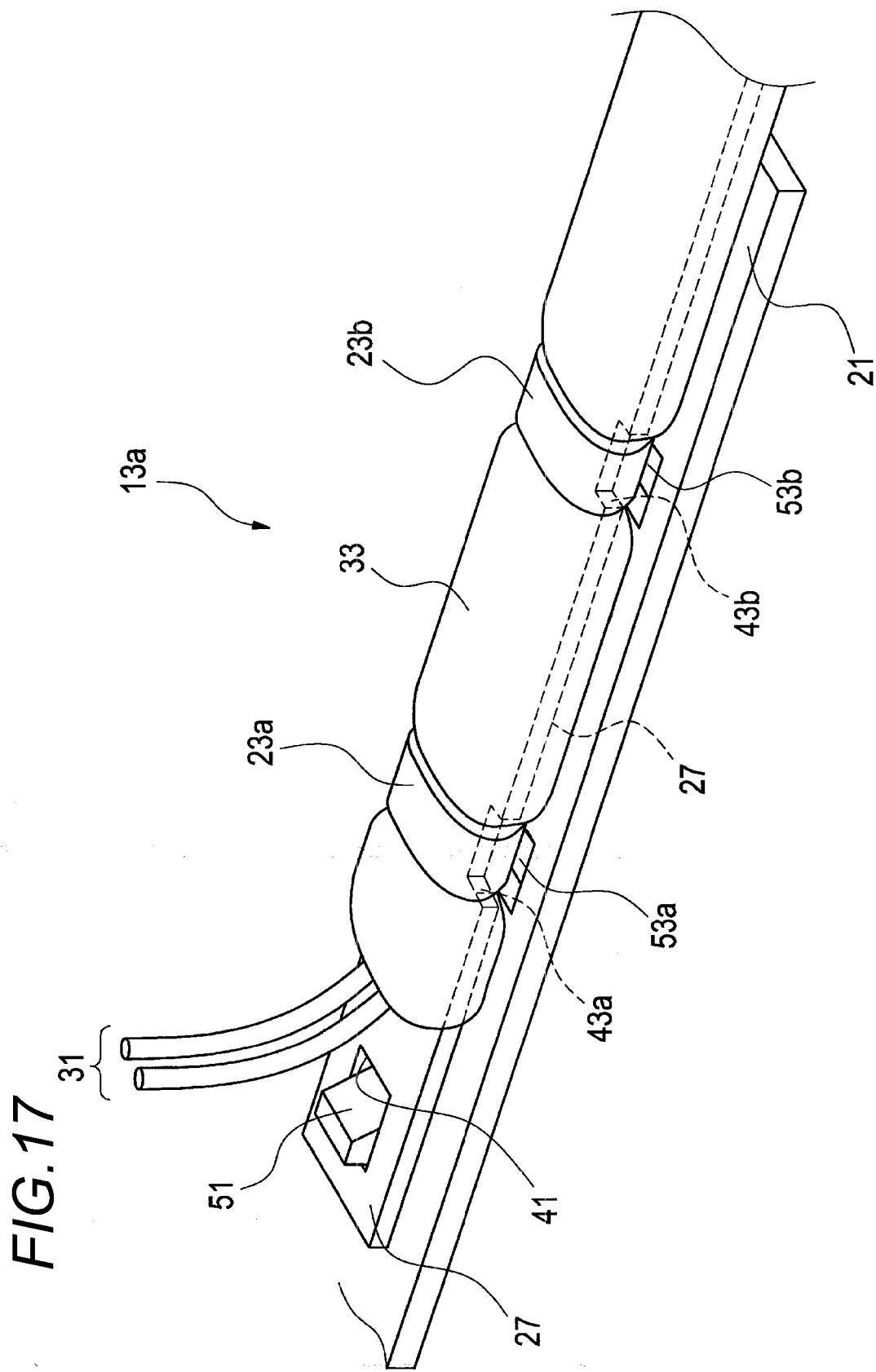
FIG. 17 is a perspective view showing a condition in which the wire harness is fastened to the fixing-side protector.
Figure 18:
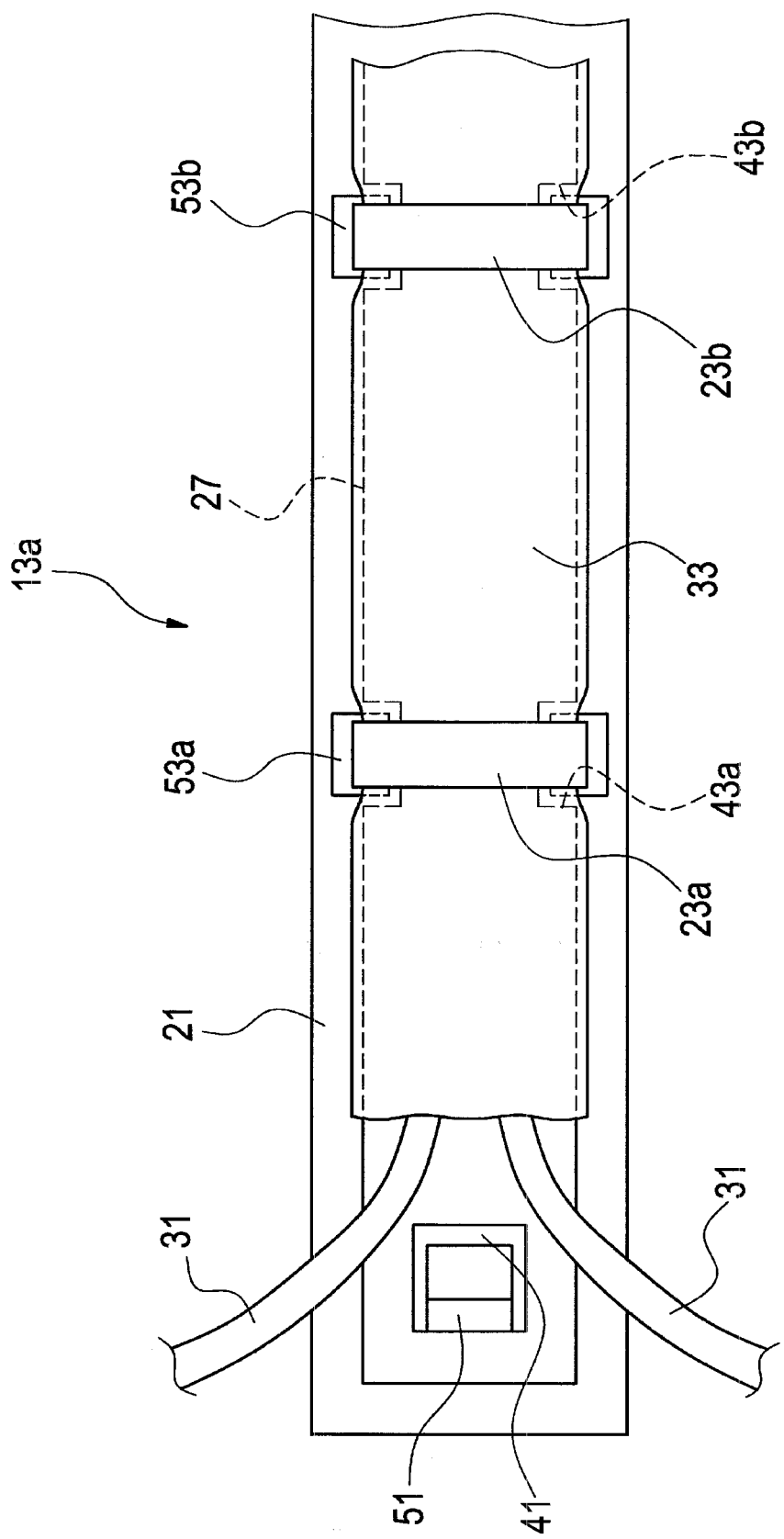
FIG. 18 is a plan view showing the condition in which the wire harness is fastened to the fixing-side protector.

Next, the moving-side protector 25 will be described with reference to FIG. 14 to FIG. 16.

The moving-side protector 25 is integrally molded, using synthetic resin, and serves to connect the moving-side connecting portion 13b of the wire harness assembly 13 to the window glass 5. A retaining projection 61 for retaining the retaining hole 45 formed in the strip-like plate spring 27, binding member through holes 62a, 62b for the passage of the binding bands 23a, 23b therethrough, etc., are formed at the moving-side protector 25.

For connecting the moving-side connecting portion 13b to the moving-side protector 25, the retaining hole 45 formed in the end portion G is retained on the retaining projection 61. As a result, the moving-side connecting portion 13b is positioned relative to the moving-side protector 25 as shown in FIG. 16, and in this condition the binding is effected using the binding bands 23a, 23b, so that the moving-side connecting portion 13b is connected to the moving-side protector 25 as described with reference to FIG. 7.

Namely, in the moving-side protector 25, also, the connection of the moving-side connecting portion 13b is effected in the same manner as in the fixing-side protector 21, and the shifting and withdrawal of the strip-like plate spring 27 in the longitudinal direction and the withdrawal of the wires 31, etc., can be prevented.

Therefore, the upward and downward movement of the extending portion 13c, etc., as described with reference to FIG. 5 can be effect smoothly and besides accurately without causing the shifting.

The wire harness installation structure 11 of the one embodiment is of such a construction that the displacement of the extending portion 13c of the wire harness in accordance with the movement of the window glass 5 is restrained by the strip-like plate spring 27 set longitudinally along this extending portion 13c, and as compared with the conventional installation structures in which the guide rail or the harness receiving box is used for restraining the displacement of the extending portion, the number of the parts to be used can be greatly reduced, and at the same time the structures of the used parts can be simplified. Therefore, the cost of an apparatus employing this installation structure can be reduced.

Furthermore, the whole of the extending portion 13c is covered with the protective member 33 of the mesh structure which discharges water, and therefore even if water such as rain water slashes on it during the travel of the automobile, the water immediately flows out from the extending portion 13c, and therefore the water will not reside in the extending portion 13c.

Therefore, the freezing of water will not occur, and an accident such as the cutting of the wire group 31 due to the freezing can be prevented from happening, and the reliability of the automobile is enhanced.

Here, the relation between the retaining projection 51 formed on the fixing-side protector 21 and the retaining hole 41 formed in the strip-like plate spring 27 will be described with reference to FIG. 13 to FIG. 15. FIG. 13 to FIG. 15 schematically show the fixing-side protector, etc., for illustration purposes, and reference will be suitably made to FIG. 11 when giving a description.

Namely, the positions of the retaining hole 41 and notch portions 43a, 43b formed in the strip-like plate spring 27 correspond respectively to the positions of the retaining projection 51 and binding band through holes 53a, 53b formed at the fixing-side protector 21. Therefore, in the case of locating the strip-like plate spring 27 in the predetermined position at the fixing-side protector 21, the retaining hole 41 is retained on the retaining projection 51, and the strip-like plate spring 27 is set along the fixing-side protector 21 as indicated in imaginary lines in FIG. 12, and by doing so, the positions of formation of the binding band through holes 52a, 53b conform respectively to the positions of formation of the notches 43a, 43b.

As described earlier, when the connecting portion 13a is to be connected to the fixing-side protector 21, the wires 31 is bound onto the strip-like plate spring 27 as shown in FIG. 8 prior to this connection, and then it is covered with the protective member 33, and then the connecting portion 13a is positioned relative to the fixing protector 21 as shown in FIG. 13.

When the retaining hole 41 is retained on the retaining projection 51 as described above at the time of effecting this positioning, the notch portions 43a, 43b are located respectively at the positions of formation of the binding band through holes 53a, 53b without effecting any positioning operation. By fastening the binding bands 23a, 23b in this condition, the fixing-side protector 21 and the strip-like plate spring 27 and wires 31 which are covered with the protective member 33 are integrally combined together.

Figure 19:
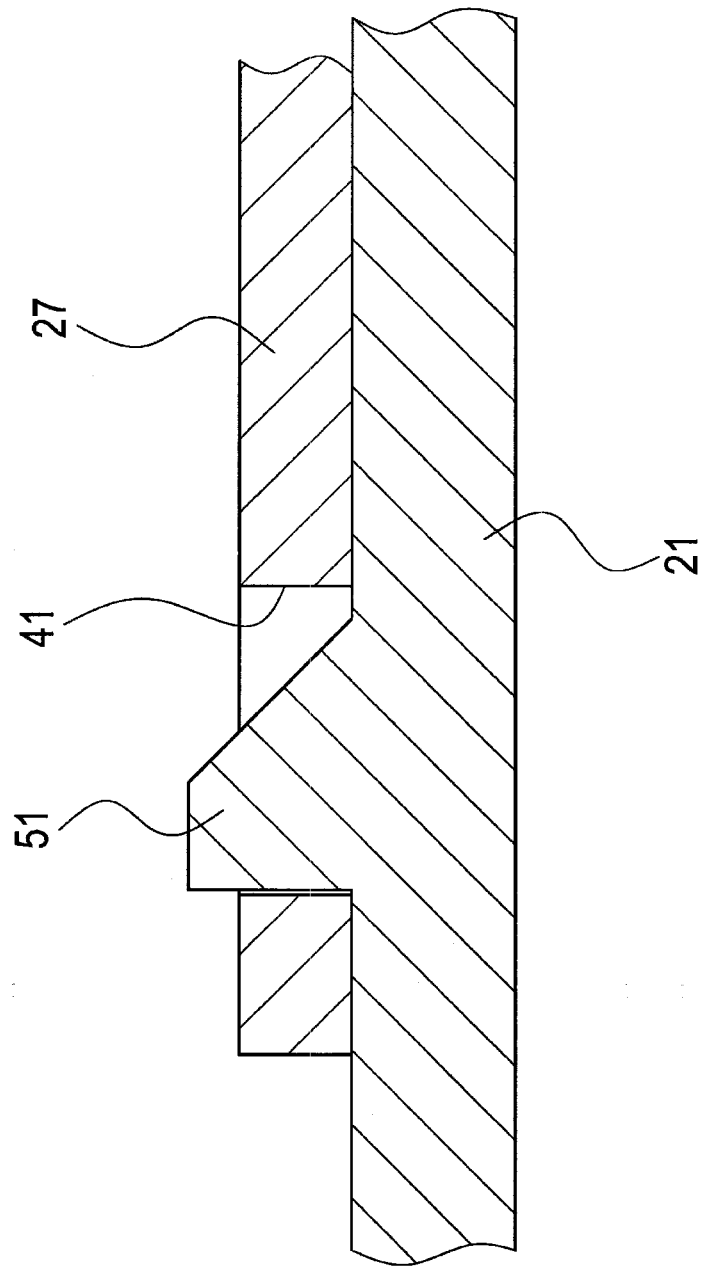
FIG. 19 is a cross-sectional view showing a condition in which a retaining projection and a retaining hole are retained relative to each other.
Figure 20:
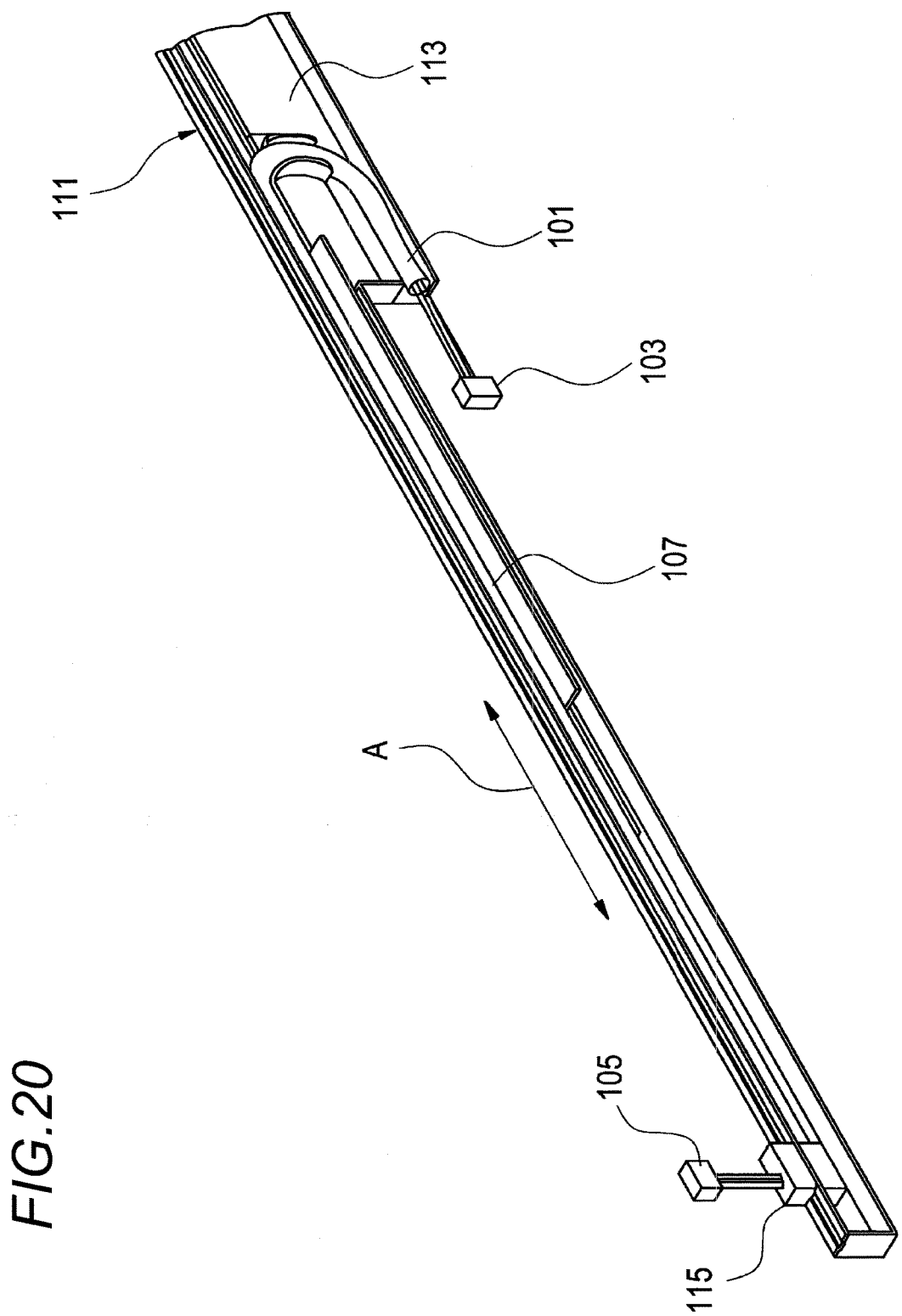
FIG. 20 is a perspective view showing an example of conventional wire harness installation structure.
Figure 21:
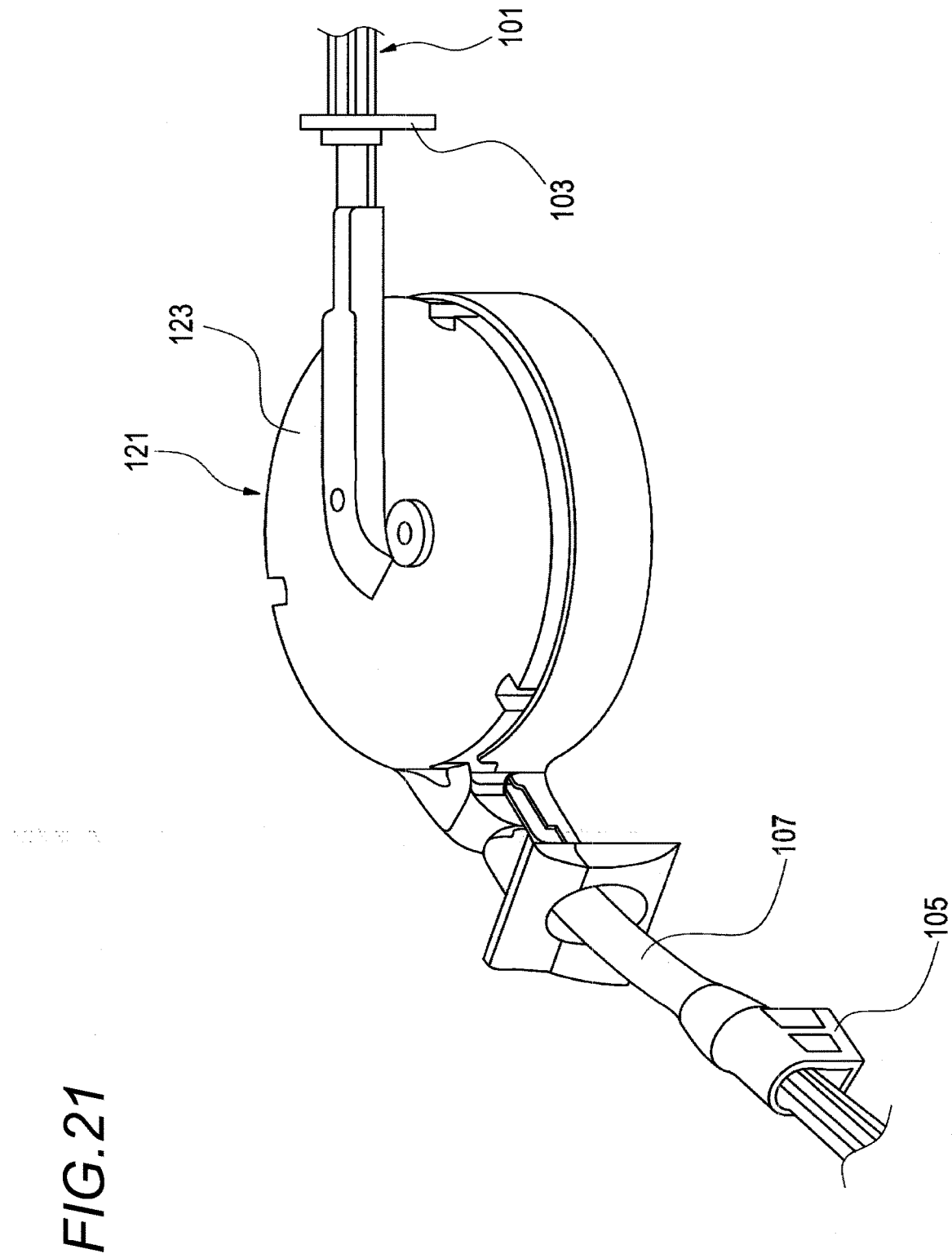
FIG. 21 is a perspective view showing another example of conventional wire harness installation structure.
Figure 22:
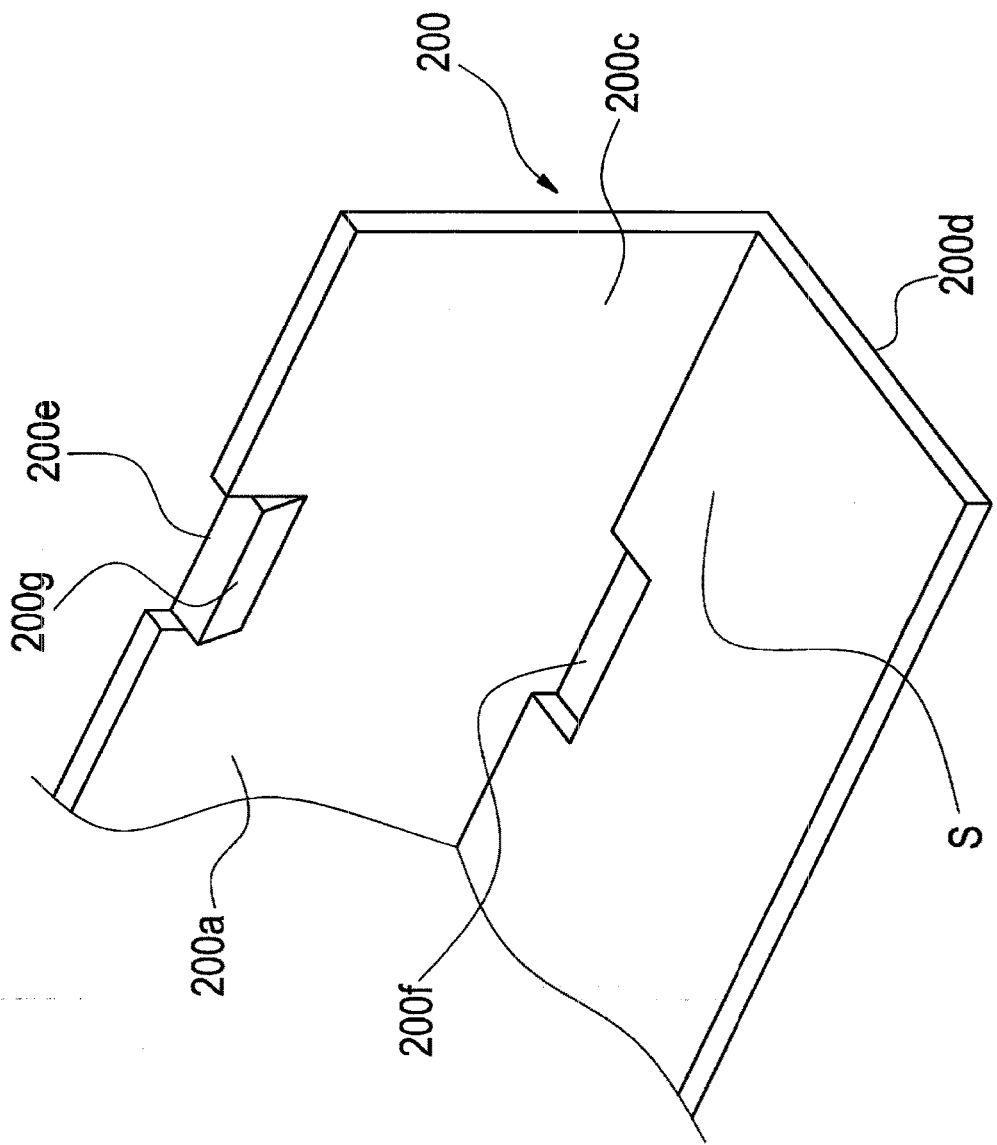
FIG. 22 is a perspective view showing other conventional wire harness installation structure.
Figure 23:
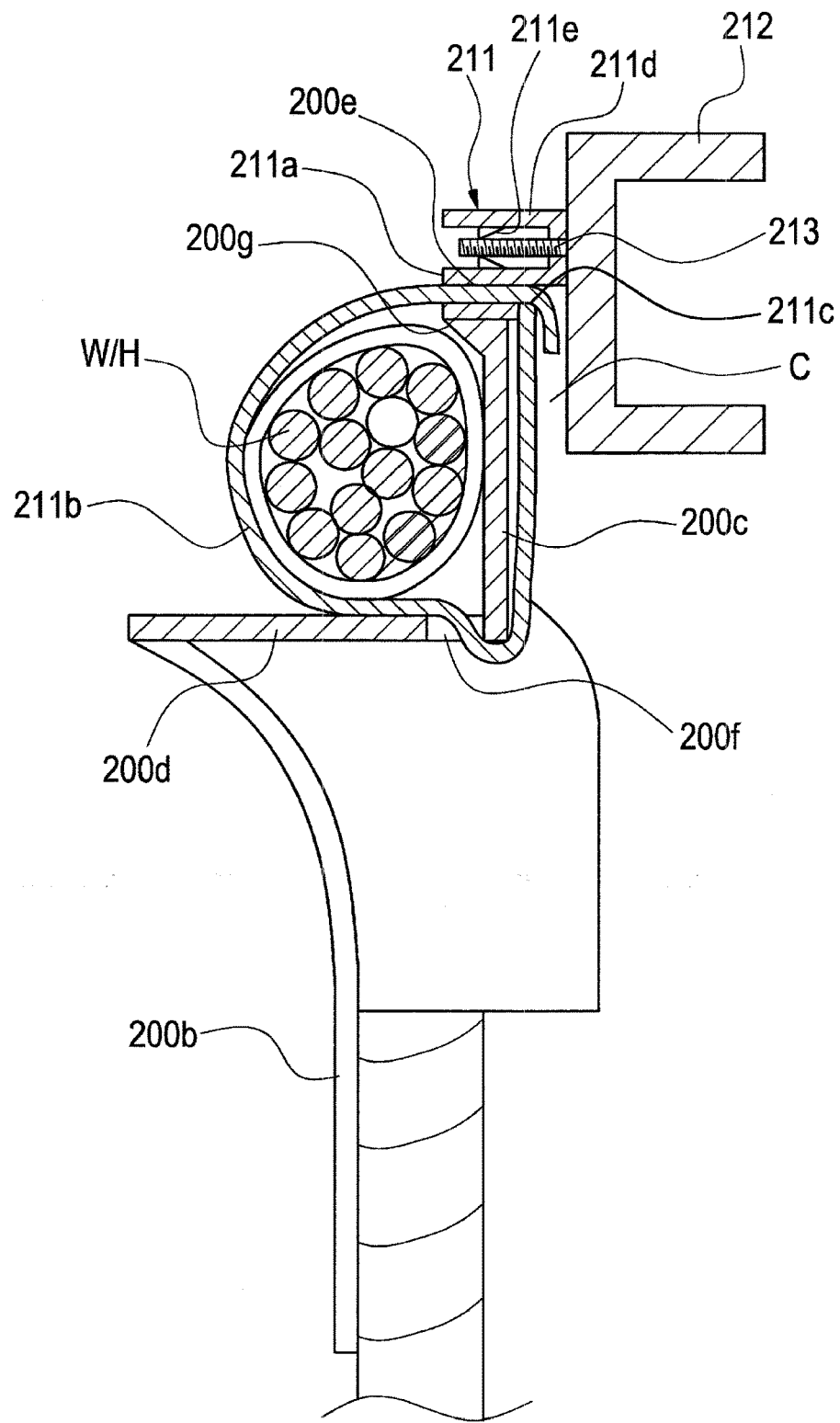
FIG. 23 is a cross-sectional view showing the other conventional wire harness installation structure.

Although tension acts on the strip-like plate spring 27, etc., during the time when the extending portion 13c of the wire harness assembly 13 moves upward and downward as described above, the strip-like plate spring will not be shifted in the longitudinal direction and will not drop, since the end portion of the strip-like plate spring 27 is retained on the retaining projection 51 as shown on an enlarged scale in FIG. 19. And, the strip-like plate spring 27, the wires 31, etc., are integrally combined with the fixing-side protector 21 by the binding bands 23a, 23b as described above, and therefore the withdrawal of the wires 31, etc., will not occur, and the fixing-side end portion of the extending portion 13c is stably fixed to the door panel 3a.

Furthermore, the notch portions 43a, 43b, 47a, 47b corresponding respectively to the binding band through holes 53a, 53b, 62a, 62b of the fixing-side protector 21 and moving-side protector 25 are formed in the strip-like plate spring 27, and therefore at the time when the strip-like plate spring 27 and the wires 31 are fastened together to the fixing-side protector 21 and the moving-side protector 25 by the binding bands 23, the binding bands 23 are engaged also in the notch portions 43a, 43b, 47a, 47b. Therefore, the strip-like plate spring 27 and the wires 31 will not be shifted in the longitudinal direction, and the movement of the wires 31 can be properly regulated.

The present invention is not limited to the above-mentioned embodiment, and modifications, improvements, etc., can be suitably made. Furthermore, the material, shape, dimensions, numeral values, form, number, disposition, etc., of each of the constituent elements of the above-mentioned embodiment are arbitrary and will not be limited in so far as the prevention invention can be achieved.

For example, although as the protective member, one obtained by forming the synthetic resin (chemical fibers) into the mesh-like shape is used, it may be one obtained by forming a metallic filament into a mesh-like shape instead of using the chemical fibers.

In this case, similar effects as described above in the above embodiment can be obtained, and besides a shielding effect is obtained, and therefore the wire harness can be used, for example, in a signal circuit or the like.

Furthermore, for providing a protective member, holes or slits may be formed in a conventional protector or a corrugated tube, and in this case, water, such as rain water, splashing on the extending portion can be drained, and the freezing of the water and the cutting of the wires due to the freezing can be positively prevented. Furthermore, without the freezing of the water, there are obtained advantages such as the smooth movement of the extending portion.

Although the present invention has been described in detail with reference to the specified embodiment, it will be manifest to those skilled in the art that various changes and modifications can be added without departing from the sprits and scope of the present invention.

The present invention is based on Japanese Patent Application (Patent Application No. 2008-221511) filed on Aug. 29, 2008 and Japanese Patent Application (Patent Application No. 2008-221811) filed on Aug. 29, 2008, and contents of which are incorporated herein by reference.

INDUSTRIAL APPLICABILITY

In the wire harness installation structure of the present invention, the part for restraining the extraordinary displacement of the extending portion is the strip-like plate spring set along the extending portion, and therefore as compared with the conventional installation structures in which the guide rail or the harness receiving box is used for restraining the extraordinary displacement of the extending portion, the number of the parts to be used can be greatly reduced, and at the same time the structures of the used parts can be simplified, and the cost of the apparatus employing this installation structure can be reduced. Furthermore, the extending portion of the wire harness is covered with the protective member in which water will not reside, and therefore even when rain water or the like splashes on the wire harness, it is immediately drained. Therefore, water such as rain water will not reside in the extending portion of the wires, and the cutting of the wires due to the freezing of the residing water can be prevented from occurring.

In the wire harness installation structure of the present invention, the part for restraining the extraordinary displacement of the extending portion is the strip-like plate spring set along the extending portion, and therefore as compared with the conventional installation structures in which the guide rail or the harness receiving box is used for restraining the extraordinary displacement of the extending portion, the number of the parts to be used can be greatly reduced, and at the same time the structures of the used parts can be simplified, and the cost of the apparatus employing this installation structure can be reduced.

Furthermore, the strip-like plate spring has the notch portions corresponding to the binding band through holes of the fixing-side protector and moving-side protector, and therefore when the wires and the strip-like plate spring are fastened together to the fixing-side protector and the moving-side protector by the binding bands, the binding bands are engaged also in the notch portions, and therefore the binding is effected in such a manner that the strip-like plate spring will not be shifted in the longitudinal direction.

REFERENCE SIGNS LIST 1 automobile
3 back door
3a door panel (stationary structure)
5 window glass (movable structure)
7 electrical part
11 wire harness installation structure
13 wire harness assembly
13a fixing-side connecting portion
13b moving-side connecting portion
13c extending portion
21 fixing-side protector (second interconnecting member)
23a, 23b binding band
25 moving-side protector (first interconnecting member)
27 strip-like plate spring
31 wire
33 protective member
41, 45 retaining hole
51, 61 retaining projection
53a, 53b binding member passage hole
62a, 62b binding member passage hole

The invention claimed is:

1. A wire harness installation structure, comprising:
a wire in which a fixing-side connecting portion to be fixed to a door is provided at one end side of the wire in a wire extending direction thereof and a moving-side connecting portion to be fixed to a window attached to the door is provided at the other end side of the wire in the wire extending direction, the window being provided so as to be movable relative to the door, an extending portion of the wire between the fixing-side connecting portion and the moving-side connecting portion being provided with an excess length for allowing a movement of the window;
a strip-like plate spring is provided along the extending portion in an extending direction of the extending portion, and the extending portion being installed in a state that the extending portion is bent into a generally U-shape or curved shape and
a protective member which covers both of the extending portion and the strip-like plate spring so that water will not reside thereon,
wherein a fixing-side protector which is fixed to the door is connected to the fixing-side connecting portion,
wherein the strip-like plate spring includes a retaining hole and the fixing-side protector includes a retaining projection, the retaining projection integrally formed with the fixing-side protector and protruding from a surface of the fixing-side protector contacting the strip-like plate spring,
wherein the strip-like plate spring is connected to the fixing side protector by the retaining hole being engaged with the retaining projection,
wherein the strip-like plate spring is engaged at one end with the door and at an opposite end with the window,
wherein the window is movable relative to the door along on an upward-downward direction, and
wherein:
the strip-like plate spring includes notch portions, and the fixing-side protector includes binding band through holes, and wherein in response to the retaining hole being retained on the retaining projection, the notch portions are aligned respectively at positions of the binding band through holes.

2. The wire harness installation structure according to claim 1, wherein the protective member is comprised of synthetic fiber forming into a mesh shape; and wherein the synthetic fiber has a wear-resistance and flexibility.

3. The wire harness installation structure according to claim 1, wherein the protective member is comprised of metallic filament forming into a mesh shape; and wherein the metallic filament has a wear-resistance and flexibility.

4. The wire harness installation structure according to claim 1, wherein the protective member has a hole or a slit for draining water.

5. The wire harness installation structure according to claim 1, wherein a movable protector which is fixed to the window is connected to the moving-side connecting portion; and wherein the fixing-side protector has a groove directed toward the window, and the extending portion of the wire is contained in the groove.

6. The wire harness installation structure according to claim 1, wherein a movable protector which is fixed to the window is connected to the moving-side connection portion; and wherein the fixing-side protector and the movable protector are arranged along the upward-downward direction.

7. The wire harness installation structure according to claim 1, wherein in response to the window moving relative to the door along the upward-downward direction, the extending portion moves in the upward-downward direction according to the movement of the window, and wherein the strip-like plate spring and the window are separated from each other and are different parts from each other.

* * * * *